United States Patent
Yoshida et al.

(10) Patent No.: US 9,489,594 B2
(45) Date of Patent: Nov. 8, 2016

(54) IMAGE PROCESSING DEVICE, IMAGE PROCESSING METHOD AND PROGRAM

(71) Applicant: Sony Corporation, Tokyo (JP)

(72) Inventors: Kyosuke Yoshida, Kanagawa (JP);
Kenji Tanaka, Kanagawa (JP);
Yukihiro Nakamura, Kanagawa (JP);
Yoshihiro Takahashi, Kanagawa (JP);
Kentaro Fukazawa, Tokyo (JP);
Kazumasa Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 146 days.

(21) Appl. No.: 14/033,577

(22) Filed: Sep. 23, 2013

(65) Prior Publication Data

US 2014/0086496 A1    Mar. 27, 2014

(30) Foreign Application Priority Data

Sep. 27, 2012 (JP) ................................. 2012-213526

(51) Int. Cl.
*G06K 9/00* (2006.01)
*G06K 9/62* (2006.01)

(52) U.S. Cl.
CPC ......... *G06K 9/6215* (2013.01); *G06K 9/00744* (2013.01); *G06K 9/00751* (2013.01); *G06K 9/00765* (2013.01); *G06K 9/00288* (2013.01)

(58) Field of Classification Search
CPC .................. G06F 17/30153; G06F 17/30321; G06F 17/30657; G06F 17/30817; G06F 17/30858; G06F 17/30979; G06K 9/00288; G06K 9/00744; G06K 9/00751; G06K 9/00765; G06K 9/6202; G06K 9/6215; G06K 9/00677

USPC .......................................................... 382/220
See application file for complete search history.

(56) References Cited

U.S. PATENT DOCUMENTS

| | | | | |
|---|---|---|---|---|
| 7,751,683 B1* | 7/2010 | Belknap | ............ | G06F 17/30843 348/700 |
| 2005/0036704 A1* | 2/2005 | Dumitras | ............ | G06K 9/00234 382/260 |
| 2005/0157908 A1* | 7/2005 | Matsugu | ............ | G06K 9/00342 382/107 |
| 2005/0276488 A1* | 12/2005 | Wan | .......................... | G06T 5/20 382/232 |
| 2006/0275020 A1* | 12/2006 | Sung | ...................... | H04N 5/772 386/224 |
| 2008/0126812 A1* | 5/2008 | Ahmed | ................... | H04N 19/61 713/189 |
| 2008/0144890 A1* | 6/2008 | Ogawa | ................... | G11B 27/034 382/118 |
| 2009/0089056 A1* | 4/2009 | Fujii | ................... | G06F 17/30746 704/246 |
| 2009/0169168 A1* | 7/2009 | Ishikawa | ............ | G06F 17/30017 386/278 |

(Continued)

FOREIGN PATENT DOCUMENTS

WO    WO2011/130564    * 10/2011

*Primary Examiner* — Stephen R Koziol
*Assistant Examiner* — Shaghayegh Azima
(74) *Attorney, Agent, or Firm* — Frommer Lawrence & Haug; William S. Frommer

(57) ABSTRACT

An image processing device includes an evaluation unit which acquires a search pattern which is an appearance pattern of a person in a scene of a video content containing the scene, where a similar scene is to be searched, and a search target pattern which is an appearance pattern of a person in a video content which is to be a search target of the similar scene, calculates a degree of similarity between the search pattern and the search target pattern, and determines the similar scene on a basis of the calculated degree of similarity.

16 Claims, 26 Drawing Sheets

(56) References Cited

U.S. PATENT DOCUMENTS

| | | | |
|---|---|---|---|
| 2009/0310931 A1* | 12/2009 | Nishiura | G11B 27/105 386/279 |
| 2010/0100549 A1* | 4/2010 | Ishida | G06F 17/3002 707/741 |
| 2010/0135580 A1* | 6/2010 | Liu | G06K 9/00268 382/195 |
| 2010/0172591 A1* | 7/2010 | Ishikawa | G10L 25/48 382/224 |
| 2010/0272365 A1* | 10/2010 | Yamamoto | G06K 9/00221 382/190 |
| 2011/0150428 A1* | 6/2011 | Eggink | G11B 27/034 386/285 |
| 2011/0194843 A1* | 8/2011 | Harada | H04N 5/77 386/326 |
| 2011/0222782 A1* | 9/2011 | Kashiwagi | G06K 9/00711 382/218 |
| 2012/0147265 A1* | 6/2012 | Gu | H04N 5/4403 348/473 |
| 2012/0229629 A1* | 9/2012 | Blumstein-Koren | G06F 17/3079 348/143 |
| 2012/0233168 A1* | 9/2012 | Terao | G06F 17/30705 707/738 |
| 2013/0042262 A1* | 2/2013 | Riethmueller | G06F 17/30846 725/14 |
| 2013/0071012 A1* | 3/2013 | Leichsenring | G06K 9/80 382/154 |
| 2013/0282804 A1* | 10/2013 | Mate | G11B 27/11 709/204 |

\* cited by examiner

FIG. 11
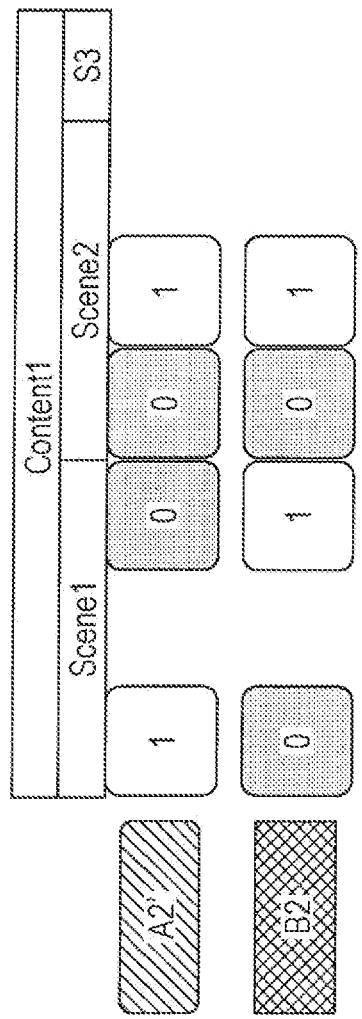
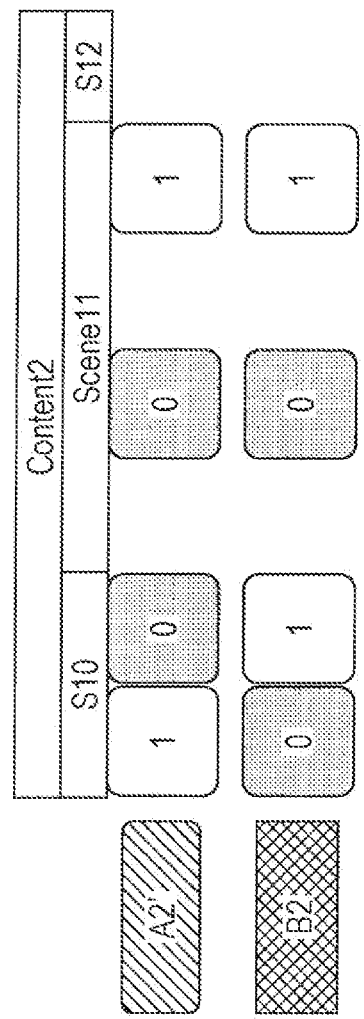

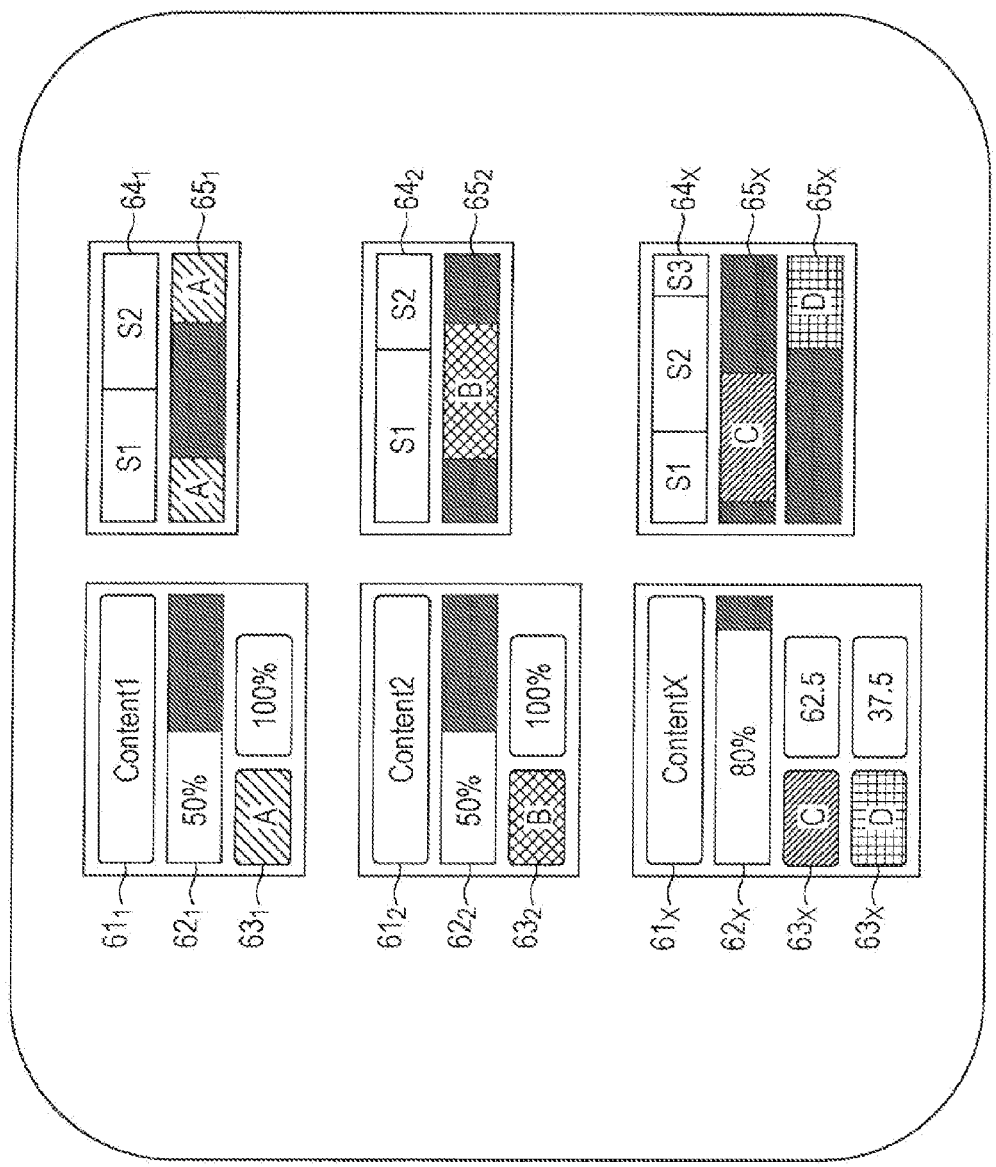

IMAGE PROCESSING DEVICE, IMAGE PROCESSING METHOD AND PROGRAM

BACKGROUND

The present disclosure relates to an image processing device, an image processing method and a program. In particular, the present disclosure relates to an image processing device, an image processing method and a program, each of which enables searching for many similar scenes.

Many technologies have been proposed which search for similar scenes within a database in which many video contents are stored, where the similar scenes are similar to a particular scene.

In the searching for similar scenes, normally, the feature values of the scene to be searched for (the search scene) are extracted, and a scene having feature values similar to those of the search scene is detected as a similar scene from within video content stored in a database.

An example of the extracted feature value is the spatial information of an image (a still image) which configures a moving picture. An example of such spatial information uses color space information such as a histogram or the histogram of an edge (for example, refer to Japanese Unexamined Patent Application Publication No. 2010-97246).

However, the computational load of such a feature value is great, and a significant amount of time is necessary. In addition, the data size is also large.

In addition, there is also a feature value which uses temporal information. For example, there is a configuration in which scene change points are detected from a moving image, the time intervals therebetween are calculated, and the time intervals themselves are used as the feature values (for example, refer to Japanese Unexamined Patent Application Publication No. 2009-49666).

SUMMARY

However, when the scene change point intervals are used as the feature values as in Japanese Unexamined Patent Application Publication No. 2009-49666, there is a concern that searching may not be successful in a case in which scenes are re-ordered or the length of the content is adjusted by cut editing or the like.

It is desirable to provide a searching method which can search for many similar scenes.

According to an embodiment of the present disclosure, there is provided an image processing device, including an evaluation unit which acquires a search pattern which is an appearance pattern of a person in a scene of a video content containing the scene, where a similar scene is to be searched, and a search target pattern which is an appearance pattern of a person in a video content which is to be a search target of the similar scene, calculates a degree of similarity between the search pattern and the search target pattern, and determines the similar scene on a basis of the calculated degree of similarity.

According to another embodiment of the present disclosure, there is provided an image processing method including acquiring a search pattern which is an appearance pattern of a person in a scene of a video content containing the scene, where a similar scene is to be searched, and a search target pattern which is an appearance pattern of a person in a video content which is to be a search target of the similar scene, calculating a degree of similarity between the search pattern and the search target pattern, and determining the similar scene on a basis of the calculated degree of similarity.

According to still another embodiment of the present disclosure, there is provided a program which causes a computer to function as an evaluation unit which acquires a search pattern which is an appearance pattern of a person in a scene of a video content containing the scene, where a similar scene is to be searched, and a search target pattern which is an appearance pattern of a person in a video content which is to be a search target of the similar scene, calculates a degree of similarity between the search pattern and the search target pattern, and determines the similar scene on a basis of the calculated degree of similarity.

According to the embodiments of the present disclosure, a search pattern which is an appearance pattern of a person in a scene of a video content containing the scene, where a similar scene is to be searched, and a search target pattern which is an appearance pattern of a person in a video content which is to be a search target of the similar scene are acquired, a degree of similarity between the search pattern and the search target pattern is calculated, and the similar scene is determined on a basis of the calculated degree of similarity.

Furthermore, it is possible to provide the program by transmitting the program via a transmission medium, or by recording the program onto a recording medium.

The image processing device may be an independent device, and may also be an internal block which configures a single device.

According to the embodiments of the present disclosure, it is possible to search for many similar scenes.

BRIEF DESCRIPTION OF THE DRAWINGS

FIG. 11 is a diagram illustrating a calculation of the degree of similarity between the video content 1 and the video content 2;

FIG. 18 is a diagram showing an example of a search scene specification screen;

FIGS. 19A and 19B are diagrams which illustrate a method of specifying a scene to be searched for.

DETAILED DESCRIPTION OF EMBODIMENTS

Configuration Example of Image Processing Device

Figure 1:
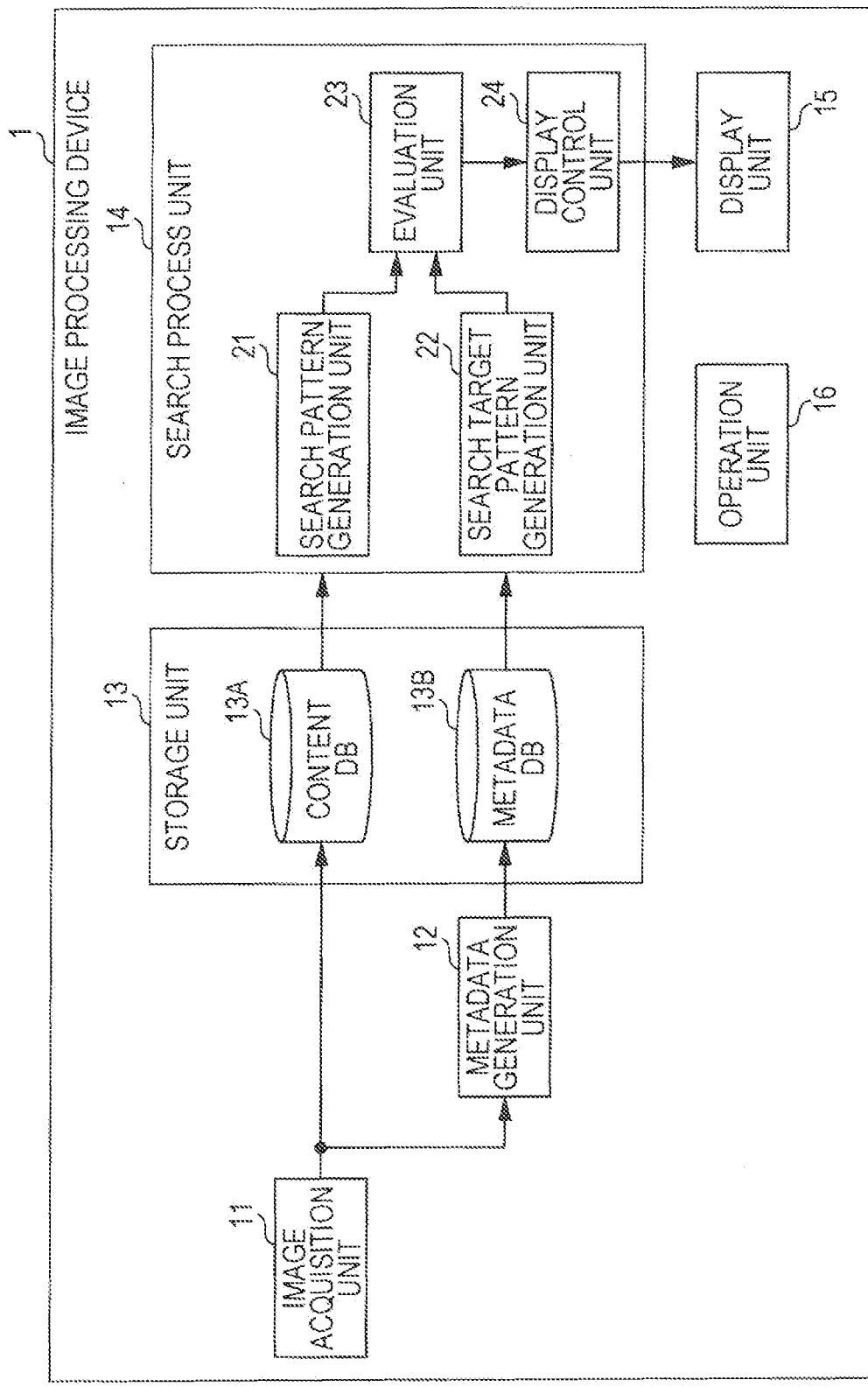
FIG. 1 is a block diagram showing a configuration example of an embodiment of an image processing device to which the present disclosure has been applied.

FIG. 1 shows a configuration example of an embodiment of an image processing device to which the present disclosure has been applied.

The image processing device 1 of FIG. 1 accumulates video content (moving picture content) which is input thereto. Furthermore, the image processing device 1 is a device which executes a search which searches for similar scenes within the accumulated video contents, where the similar scenes are similar to the scene of the video content specified by the user.

Furthermore, in the present embodiment, the term "scene" represents a partial video content of an arbitrary time span between two particular times within the video content, and does not only refer to the video content of scene units which are delimited by the scene change points described below.

The image processing device 1 includes an image acquisition unit 11, a metadata generation unit 12, a storage unit 13, a search process unit 14, a display unit 15 and an operation unit 16.

The image acquisition unit 11 acquires content data of the video content supplied from another device and supplies the content data to the metadata generation unit 12 and the storage unit 13.

The metadata generation unit 12 generates metadata of (the content data) of the video content supplied from the image acquisition unit 11 and supplies the metadata to the storage unit 13.

Figure 2:
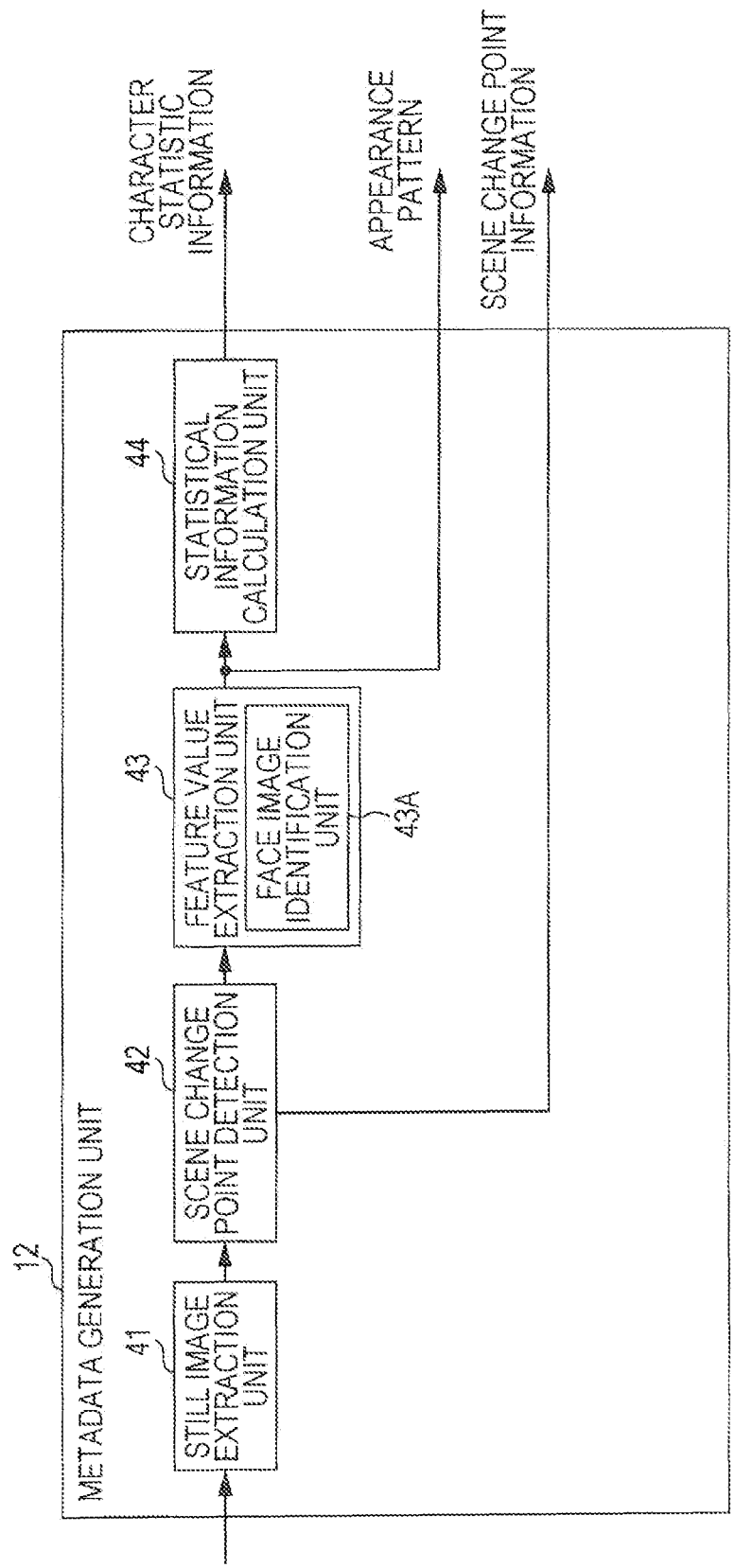
FIG. 2 is a block diagram showing a detailed configuration example of a metadata generation unit.

Here, detailed description will be given of the metadata generation unit 12 with reference to FIG. 2. FIG. 2 shows the configuration of the metadata generation unit 12 in detail.

The metadata generation unit 12 includes a still image extraction unit 41, a scene change point detection unit 42, a feature value extraction unit 43 and a statistical information calculation unit 44.

For example, the still image extraction unit 41 extracts a still image at a constant time interval, such as once per second, from a plurality of still images which configure the video content, and generates time series data which is formed from a plurality of still images which summarize the video content. Here, the time series data of the plurality of still images extracted is referred to below as the still image time series data.

The scene change point detection unit 42 detects the scene change points from the still image time series data. The scene change point is a point at which the scene changes within sequential still images. Further, since the difference (the change) in luminosity between the still images before and after the point is great, it is possible to detect the scene change point by detecting the difference in luminosity therebetween. For example, the point at which the content switches from the main part of a program to a commercial, or the point at which the content switches from a night scene to a daytime scene is detected as a scene change point. Since the scene change depends on the type of the video content, the interval and the like at which the scene change is detected differs for each video content. Furthermore, it is possible to adopt an arbitrary existing scene change detection technology for the detection of the scene change points.

The scene change point detection unit 42 generates scene change point information representing the detected scene change points and supplies the scene change point information to the storage unit 13. Further, the scene change point detection unit 42 causes the storage unit 13 to store the scene change point information.

The feature value extraction unit 43 extracts the time series pattern (hereinafter referred to as the appearance pattern) which represents the appearance of a person in the still image time series data. The time series pattern serves as the feature value of the video content. The feature value extraction unit 43 includes a face image identification unit 43A, which recognizes a face image within the image and identifies a person (an individual), in the inner portion thereof. In addition, the feature value extraction unit 43 generates an appearance pattern for each person that appears in the still image.

For example, the still image time series data of the video content 1 (Content1) is formed from five images. In a case in which "Mr. A" is not visible in the first two images, but is visible in the three remaining images, an appearance pattern of "Mr. A" is generated in which times at which "Mr. A" is visible are represented by a "1" and times at which "Mr. A" is not visible are represented by a "0", therefore the appearance pattern is A of Content1={0, 0, 1, 1, 1}.

The face images for determining an individual are registered in advance to the face image identification unit 43A.

The statistical information calculation unit 44 generates character statistical information on a basis of the appearance pattern extracted by the feature value extraction unit 43, and supplies the character statistical information to the storage unit 13. Specifically, the statistical information calculation unit 44 calculates a person appearance ratio, which is the proportion of person appearance in the still image time series data of the video content, and the appearance ratio (the appearance frequency) per character, and supplies these to the storage unit 13 as the character statistical information. Further, the statistical information calculation unit 44 causes the storage unit 13 to store the character statistical information. For example, in the still image time series data of a particular 60 images, when "Mr. A" appears in 15 still images and "Mr. B" appears in 5 still images, the person appearance ratio is 20/60=33%, the appearance ratio of "Mr. A" is 15/20=75%, and the appearance ratio of "Mr. B" is 5/20=15%.

As described above, in the metadata generation unit 12, the scene change point information, the appearance pattern and the character statistical information are generated as metadata of the video content and supplied to the storage unit 13.

Returning to FIG. 1, the storage unit 13 includes a content DB 13A which stores the content data of many video contents, and a metadata DB 13B which stores the metadata of each video content. In other words, the content data of the video content supplied from the image acquisition unit 11 is stored in the content DB 13A, and the metadata which corresponds to the content data is supplied from the metadata generation unit 12 and stored in the metadata DB 13B. Furthermore, in the present embodiment, the content DB 13A and the metadata DB 13B are separate from one another. However, the two do not have to be separated, and it is sufficient that the content data and the metadata be associated with one another and stored.

The search process unit 14 includes a search pattern generation unit 21, a search target pattern generation unit 22, an evaluation unit 23 and a display control unit 24.

The search pattern generation unit 21 generates an appearance pattern as a search pattern which corresponds to the scene of the video content to be searched for which the user specifies using the operation unit 16, and supplies the appearance pattern to the evaluation unit 23.

For example, assuming that the scene of the video content which the user is searching for is a portion formed from five still images of the video content 1 described above, the search pattern generation unit 21 generates A of Content1={0,0,1,1,1} as the search pattern.

The search target pattern generation unit 22 generates an appearance pattern of the video content of the search target as the search target pattern in order to search for a similar scene of the video content which is similar to the scene which the user is searching for, and supplies the appearance pattern to the evaluation unit 23.

For example, in the same manner as with the video content 1 described above, the search target pattern generation unit 22 generates the appearance pattern of the video content 2 in which "Mr. A" appears, A of Content2={0,1,0,1,0}, and the appearance pattern of the video content 3 in which "Mr. A" appears, A of Content3={0,0,1,1,1} as the search target patterns.

Furthermore, the search target is not limited to video content which is different from the video content which the user specified to search for. There is also a case in which the search target is the same video content as that selected by the user, and the user may also be allowed to restrict the scope of the search according to the date and time or the like of the video content. In addition, the search pattern and the search target pattern may also be generated by one pattern generation unit which includes the functions of the search pattern generation unit 21 and the search target pattern generation unit 22.

The evaluation unit 23 calculates the degree of similarity between each of the plurality of search target patterns generated by the search target pattern generation unit 22 and the search pattern generated by the search pattern generation unit 21. Furthermore, the evaluation unit 23 determines whether or not the scene of the video content is a similar scene on a basis of the calculated degree of similarity. Specifically, in a case in which the calculated degree of similarity is the same as or higher than a predetermined threshold value set in advance, the evaluation unit 23 determines that the scene of the video content which corresponds to the search target pattern is a similar scene.

For example, as described below, it is possible to calculate the degree of similarity between the video content 1 which is configured by the still image time series data of the five images described above and the video content 2.

Comp(Content1,Content2)={{0,0,1,1,1},{0,1,0,1,0}}={True,False,False,True,False}=(2/5)×100=40%

In addition, as described below, it is possible to calculate the degree of similarity between the video content 1 and the video content 3 described above.

Comp(Content1,Content3)={{0,0,1,1,1},{0,0,1,1,1}}={True,True,True,True,True}=(5/5)×100=100%

In other words, the function Comp(X, Y) which calculates the degree of similarity between appearance patterns, calculates the ratio of True as the degree of similarity, where True is a case in which the presence or absence of appearances at corresponding times match, and False is a case in which they do not match.

The degree of similarity is calculated as described above, for example, when the threshold value is set to 80%, the evaluation unit 23 determines that the video content 1 and the video content 2 described above do not resemble one another, and that the video content 1 and the video content 3 do resemble one another.

The display control unit 24 controls the display unit 15 such that the display unit 15 displays similar content or a similar scene which is determined to be similar by the evaluation unit 23. In addition, the display control unit 24 also causes the display unit 15 to display an input screen or the like of the search commands of the similar content or the similar scene.

The display unit 15 displays the input screen of the search commands, the search result display screen or the like according to the control of the display control unit 24. The display unit 15 may also display the video content (the similar scene) which has the largest degree of similarity, and in a case in which a plurality of video contents (similar scenes) having a degree of similarity greater than the threshold value are detected, the plurality of detected video contents (the similar scenes) may also be displayed as a list in descending order from the greatest degree of similarity.

The operation unit 16 receives the operation of the user and supplies control information which corresponds to the received operation to the search process unit 14 or the like. For example, the operation unit 16 receives an operation which specifies the scene of the video content which the user is searching for, and supplies information which represents the scene of the specified video content to the search pattern generation unit 21.

The image processing device 1 is configured as described above.

Furthermore, the functions of the image processing device 1 described above may also be realized by being shared by two or more devices such as a portable terminal and a server device (a cloud server). In a case in which the functions of the image processing device 1 are shared by two or more devices, it is possible to arbitrarily decide the functions shared by each of the devices.

The degree of similarity determination will be described below in detail with reference to the drawings.

Basic Method of Searching

Figure 3:
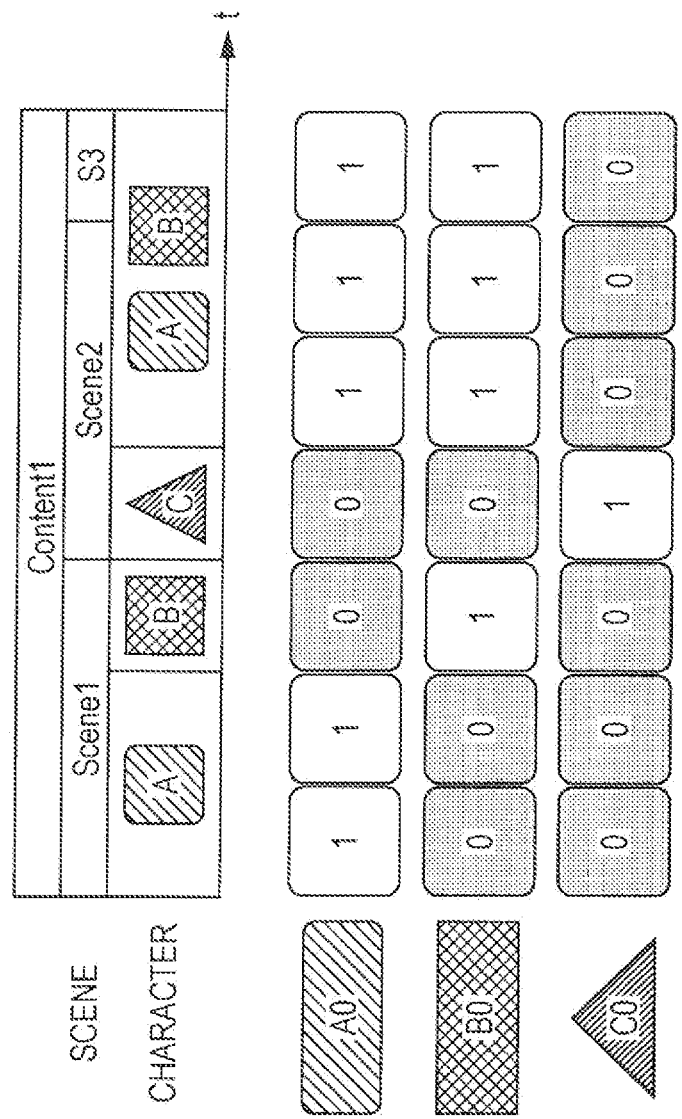
FIG. 3 is a diagram showing an example of an appearance pattern of a video content 1.

FIG. 3 shows an example of an appearance pattern of a particular video content 1.

As shown in FIG. 3, the still image time series data of the video content 1 is configured by three scene units of scene 1, 2 and 3. More specifically, of the still image time series data of the video content 1 configured by seven still images, the first three still images belong to scene 1, the next three still images belong to scene 2, and only the last (the seventh) still image belongs to scene 3.

Furthermore, in the still image time series data of the video content 1, three persons, "Mr. A", "Mr. B" and "Mr. C", appear. More specifically, "Mr. A" appears in the first two still images, "Mr. B" appears in the third still image, "Mr. C" appears in the fourth still image, and both "Mr. A" and "Mr. B" appear in the fifth to the seventh still images.

In relation to the still image time series data of the video content 1 described above, the feature value extraction unit 43 of the metadata generation unit 12 generates the appearance pattern of "Mr. A" A0 of Content1={1, 1, 0, 0, 1, 1, 1}, the appearance pattern of "Mr. B" B0 of Content1={0, 0, 1, 0, 1, 1, 1}, and the appearance pattern of "Mr. C" C0 of Content1={0, 0, 0, 1, 0, 0, 0}, as shown in FIG. 3.

Figure 4:
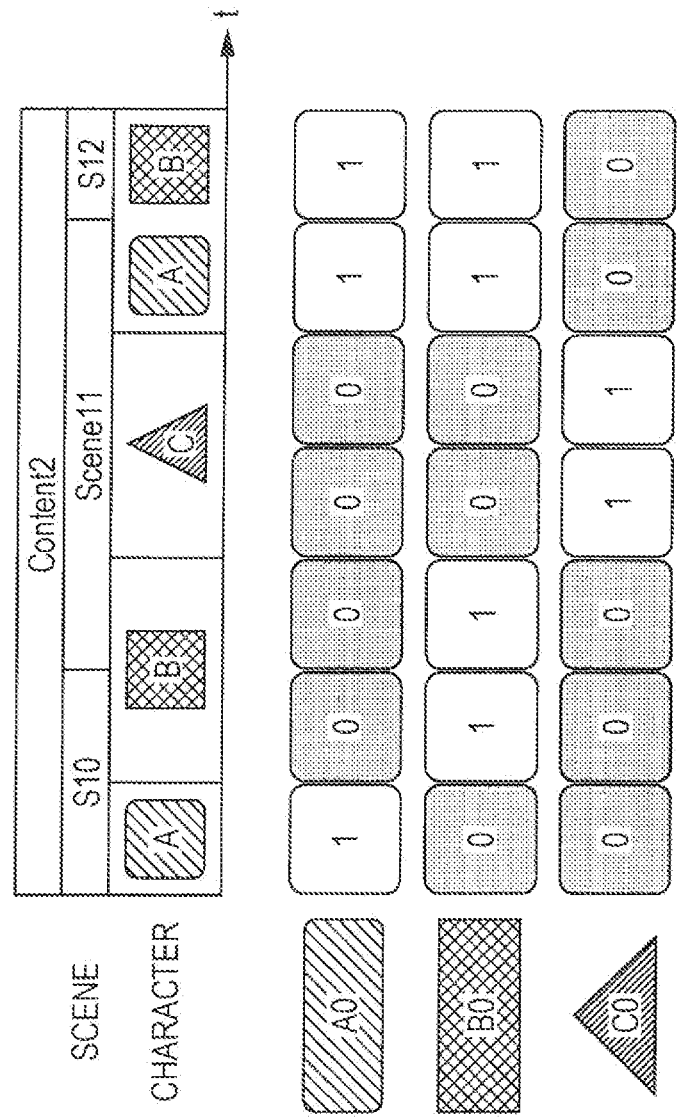
FIG. 4 is a diagram showing an example of an appearance pattern of a video content 2.

FIG. 4 shows an example of an appearance pattern of a particular video content 2.

The still image time series data of the video content 2 is configured by three scene units of scene 10, 11 and 12. More specifically, of the still image time series data of the video content 2 configured by seven still images, the first two still images belong to scene 10, the next four still images belong to scene 11, and the seventh and last still image belongs to scene 12.

Furthermore, in the still image time series data of the video content 2, three persons, "Mr. A", "Mr. B" and "Mr. C", appear. More specifically, "Mr. A" appears in the first still image, "Mr. B" appears in the next two still images, "Mr. C" appears in the following next two still images, and both "Mr. A" and "Mr. B" appear in the last two still images.

In relation to the still image time series data of the video content 2 described above, the feature value extraction unit 43 of the metadata generation unit 12 generates the appearance pattern of "Mr. A" A0 of Content2={1, 0, 0, 0, 0, 1, 1}, the appearance pattern of "Mr. B" B0 of Content2={0, 1, 1, 0, 0, 1, 1}, and the appearance pattern of "Mr. C" C0 of Content2={0, 0, 0, 1, 1, 0, 0}, as shown in FIG. 4.

Description will be given of the method of comparing the appearance patterns in a case in which a similar scene to scene 10 of the video content 2 is searched for in the video content 1 and the video content 2 which are described above.

As is made clear by the appearance pattern shown in FIG. 4, "Mr. A" and "Mr. B" appear in scene 10 of the video content 2. Therefore, the search process unit 14 searches for a similar scene by using the appearance patterns of both of "Mr. A" and "Mr. B". In this case, it is possible to raise the precision (the optimality) in comparison with searching for a similar scene by using the appearance pattern of only one of "Mr. A" or "Mr. B".

Figure 5:
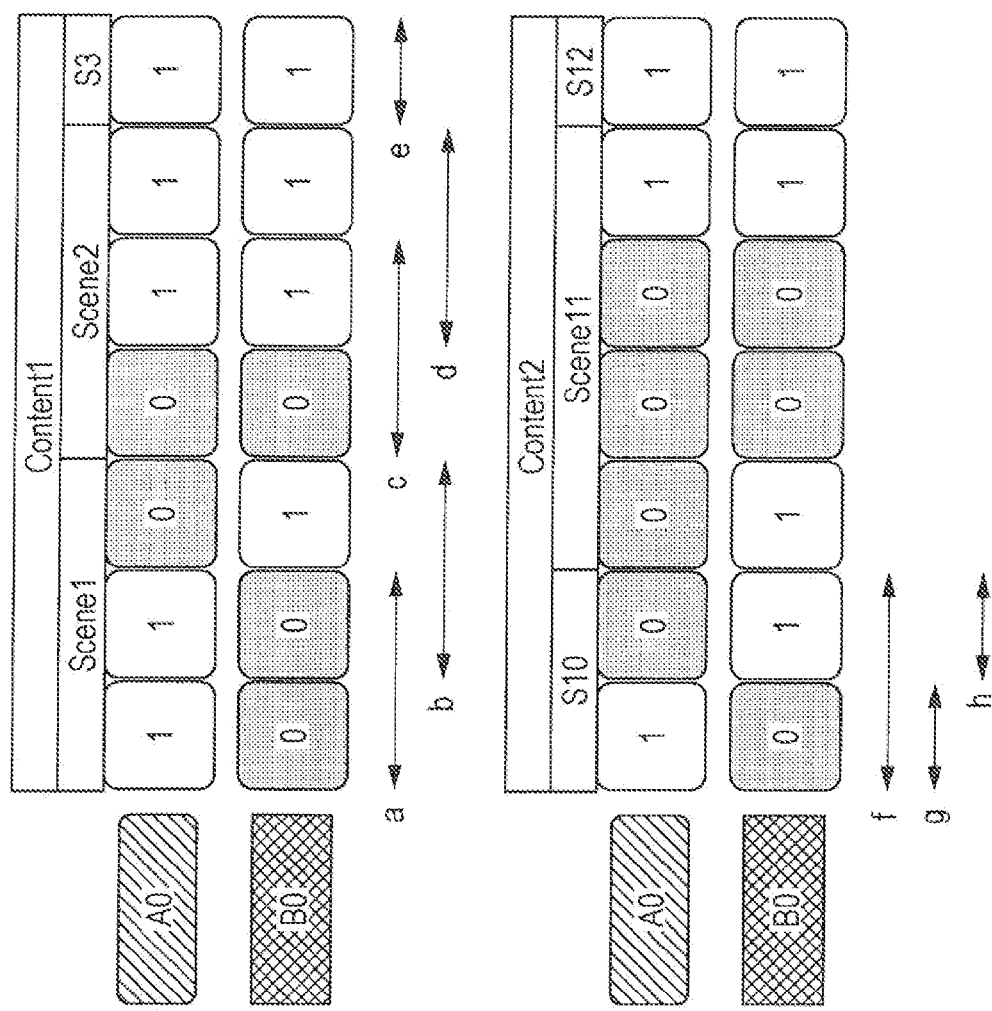
FIG. 5 is a diagram illustrating a calculation of the degree of similarity between the video content 1 and the video content 2.

FIG. 5 shows both the appearance patterns of "Mr. A" and "Mr. B" of the video content 1 and the appearance patterns of "Mr. A" and "Mr. B" of the video content 2.

The scene 10 of the video content 2 is equivalent to section f of FIG. 5. In a case in which a similar scene to the scene 10 of the video content 2 is to be detected from within the video content 1 in a range that does not bridge between scene units, the sections a to e shown in FIG. 5 are exemplified as candidates of the similar scene. In addition, since the section e of the scene 3 of the video content 1 is configured by only one still image, the search process unit 14 decomposes the section f of the scene 10 into a section g and a section h so as to match the data number with that of the section e, and compares them to the section e.

The search pattern generation unit 21 generates the search patterns of the section f, the section g and the section h which correspond to the scene 10 of the video content 2 as described below. Further, the search pattern generation unit 21 outputs the generated search patterns to the evaluation unit 23.

$f=\{\{A0\},\{B0\}\}=\{\{1,0\},\{0,1\}\}$ $g=\{\{A0\},\{B0\}\}=\{\{1\},\{0\}\}$ $e=\{\{A0\},\{B0\}\}=\{\{0\},\{1\}\}$

In this manner, when a plurality of characters are present in the search section, a pattern, in which the appearance patterns of each character are enumerated in a predetermined order, serves as the search pattern. The appearance pattern of a search section in which n characters are present can be considered as an n row array of appearance patterns.

Similarly, the search target pattern generation unit 22 generates the search target patterns of the sections a to e of the video content 1 as shown below. Further, the search target pattern generation unit 22 outputs the generated search target patterns to the evaluation unit 23.

$a=\{\{A0\},\{B0\}\}=\{\{1,1\},\{0,0\}\}$ $b=\{\{A0\},\{B0\}\}=\{\{1,0\},\{0,1\}\}$ $c=\{\{A0\},\{B0\}\}=\{\{0,1\},\{0,1\}\}$ $d=\{\{A0\},\{B0\}\}=\{\{1,1\},\{1,1\}\}$ $e=\{\{A0\},\{B0\}\}=\{\{1\},\{1\}\}$

The evaluation unit 23 calculates the degree of similarity between each of the plurality of search target patterns generated by the search target pattern generation unit 22 and the search pattern generated by the search pattern generation unit 21.

The degree of similarity between the section f and the section a is calculated as shown below, where True is a case in which the corresponding elements of the appearance patterns match, and False is a case in which they do not match.

$Comp(f,a)=\{\{\{1,0\},\{0,1\}\},\{\{1,1\},\{0,0\}\}\}=\{True, False,True,False\}=(2/4)\times100=50\%$ The degrees of similarity between the section f and the other sections b to e are calculated in the same manner.

$Comp(f,b)=100\%$ $Comp(f,c)=50\%$ $Comp(f,d)=50\%$ $Comp(g,e)=50\%$ $Comp(h,e)=50\%$ According to the above results, the evaluation unit 23 can decide the scene 1 of the video content 1 which contains the section b to be a similar scene which is similar to the scene 10 (the section f).

Modification Example of Basic Method of Searching

Next, description will be given of a modification example in which a predetermined process is added to the basic method of searching described above.

Since there is a concern that the recall is reduced when the data number (the element number) of the appearance pattern is high, it is necessary to provide some degree of flexibility. Therefore, the search process unit 14 calculates the degree of similarity after lowering the data number of the appearance pattern by compressing the appearance pattern. Accordingly, undesirable noise and some degree of differences of the appearance patterns can be absorbed, and it is possible to improve the recall.

Figure 6:
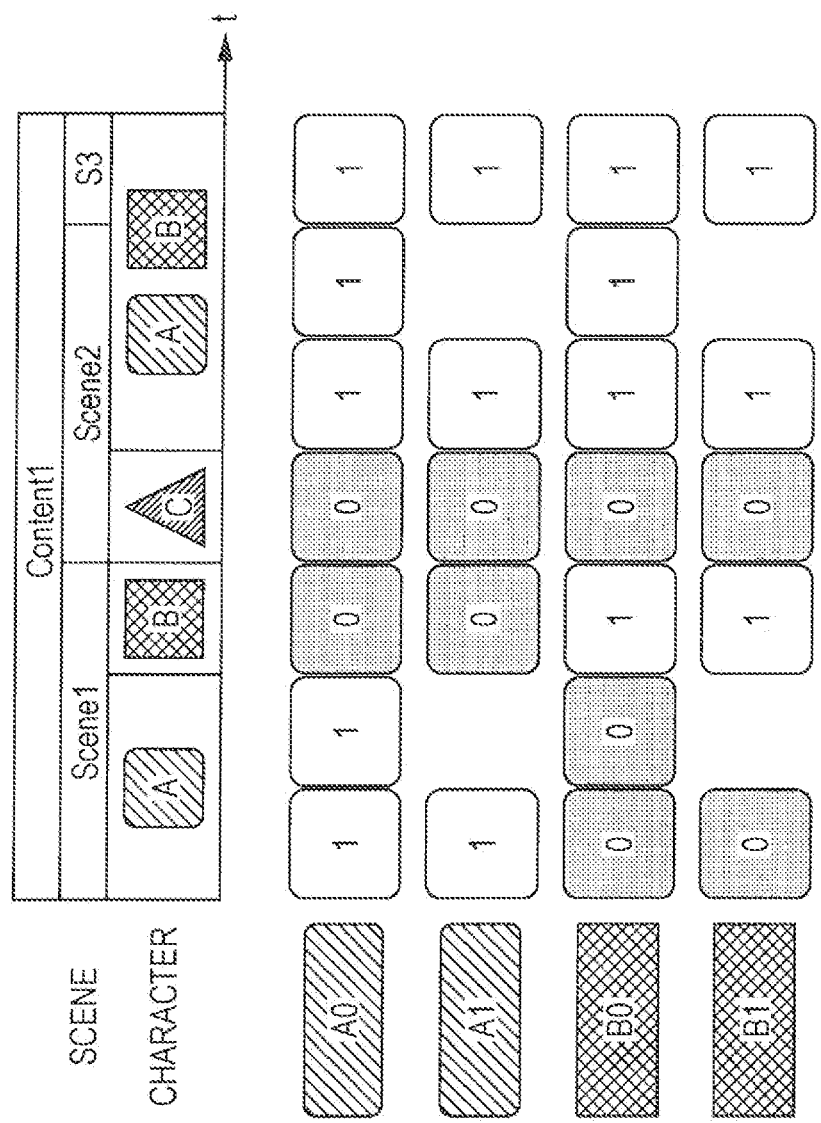
FIG. 6 is a diagram showing an example of an appearance pattern of the video content 1 after compression.

FIG. 6 shows the appearance patterns A1 and B1, which are obtained by delimiting by scene unit and compressing the appearance patterns A0 and B0 of the video content 1 shown in FIG. 3.

In the compression, in a case in which the same value continues in an appearance pattern, values from the second value onward are deleted. However, since the compression is performed delimited by scene units, even in a case in which the same value continues, the value of the time at which the scene unit changes is not deleted.

Accordingly, the appearance patterns A1 and B1, which are obtained by compressing the appearance patterns A0 and B0 of the video content 1, are as follows.

$A1$ of Content1={1,0,0,1,1}

$B1$ of Content1={0,1,0,1,1}

Figure 7:
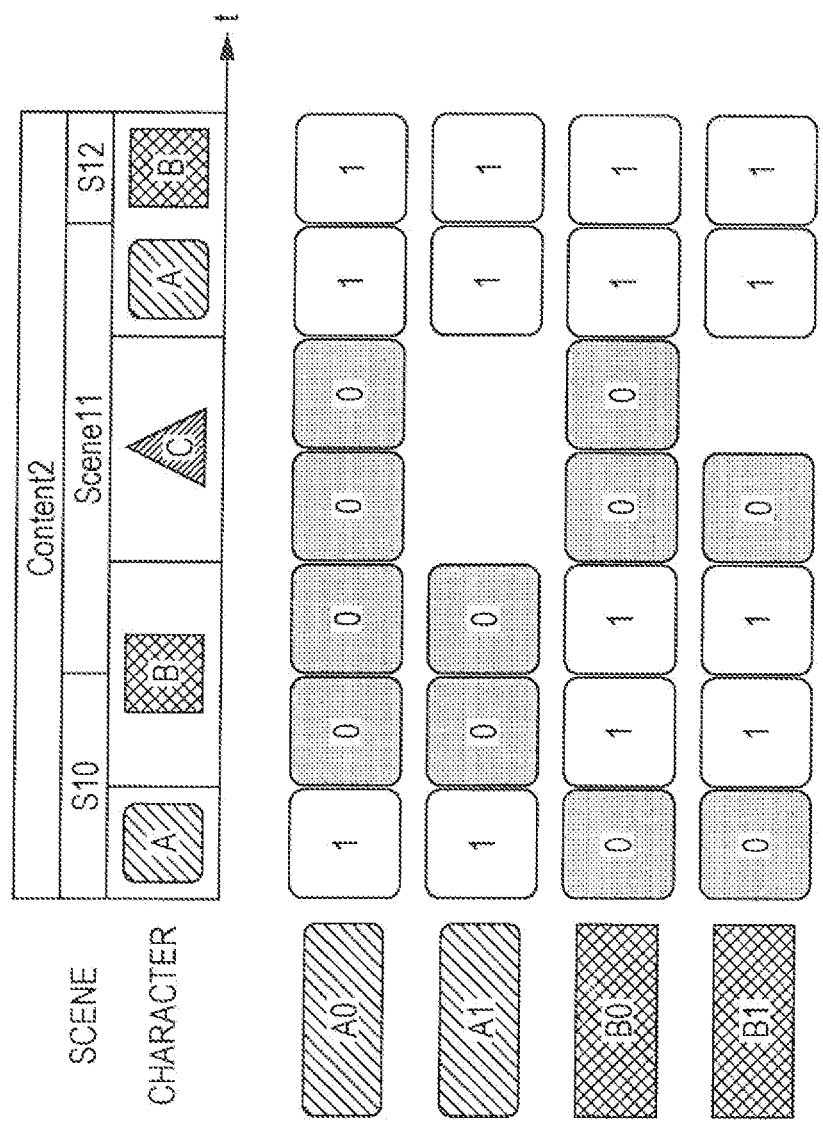
FIG. 7 is a diagram showing an example of an appearance pattern of the video content 2 after compression.

FIG. 7 shows the appearance patterns A1 and B1, which are obtained by delimiting by scene unit and compressing the appearance patterns A0 and B0 of the video content 2 shown in FIG. 4.

Further, the appearance patterns A1 and B1, which are obtained by compressing the appearance patterns A0 and B0 of the video content 2, are as follows.

$A1$ of Content2={1,0,0,1,1}

$B1$ of Content2={0,1,1,0,1,1}

Description will be given of a case in which a similar scene to the scene 10 of the video content 2 is searched for in the same manner as that of the basic method of searching using the compressed appearance patterns A1 and B1 of the video content 1, and the compressed appearance patterns A1 and B1 of the video content 2.

Figure 8:
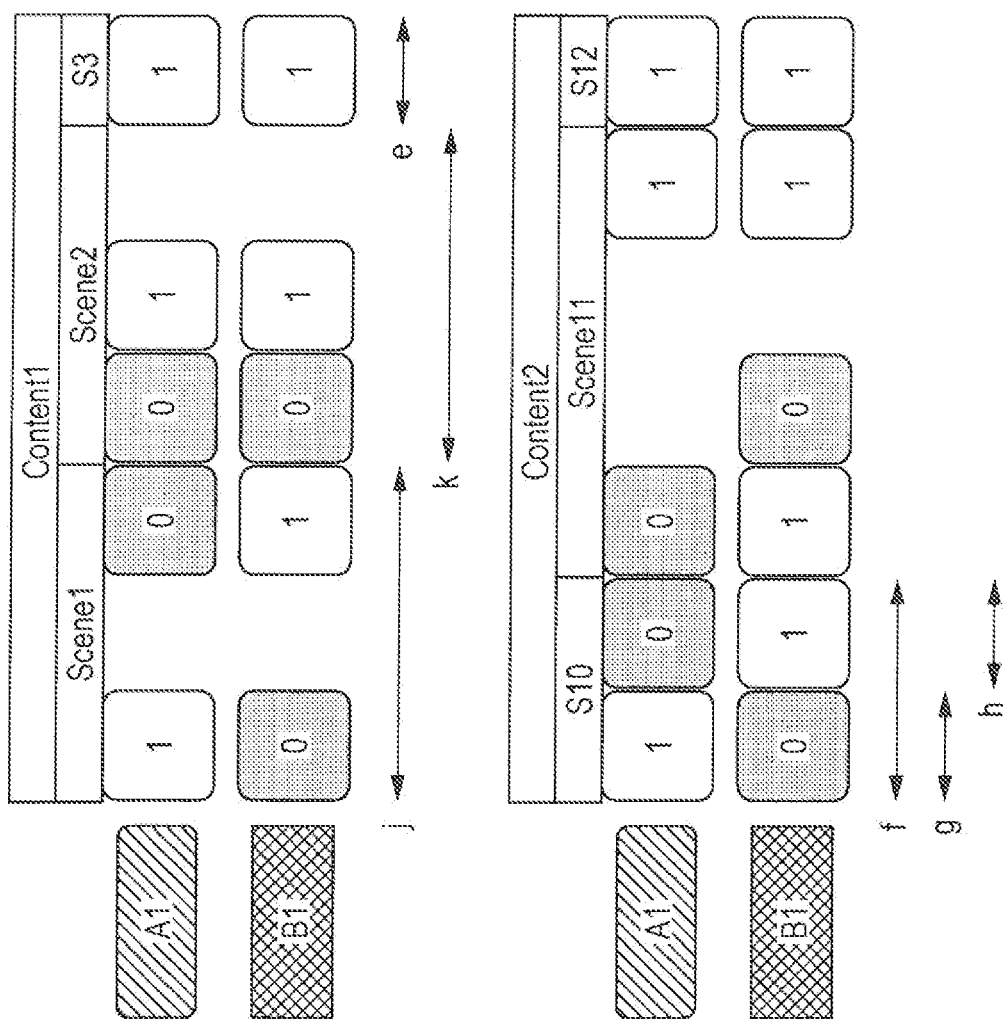
FIG. 8 is a diagram illustrating a calculation of the degree of similarity between the video content 1 and the video content 2.

FIG. 8 shows both the appearance patterns A1 and B1 of the video content 1 of FIG. 6 and the appearance patterns A1 and B1 of the video content 2 of FIG. 7.

The appearance pattern of the scene 10 of the video content 2 after compression is no different to a case in which the appearance pattern is not compressed. Accordingly, the search patterns of section f, section g and section h are the same as in the case of the basic method of searching described above.

In the appearance pattern of the video content 1 after compression, in a case in which a similar scene is to be detected in a range that does not bridge between scene units, the section j, the section k and the section e shown in FIG. 8 are exemplified as candidates of the similar scene. The search target patterns of the section j, the section k and the section e are as follows.

$j=\{\{A1\},\{B1\}\}=\{\{1,0\},\{0,1\}\}$ $k=\{\{A1\},\{B1\}\}=\{\{0,1\},\{0,1\}\}$ $e=\{\{A1\},\{B1\}\}=\{\{1\},\{1\}\}$

Accordingly, the degree of similarity between the search pattern and each of the plurality of search target patterns, which use the appearance patterns after compression, is as follows.

$Comp(f,j)=100\%$ $Comp(f,k)=50\%$ $Comp(g,e)=50\%$ $Comp(h,e)=50\%$

According to the above results, the evaluation unit 23 can decide the scene 1 of the video content 1 which contains the section j to be a similar scene to the scene 10 (the section f).

Next, description will be given of a case in which scenes which are similar to all three scenes 10 to 12 of the video content 2 are searched for from the video content 1.

Figure 9:
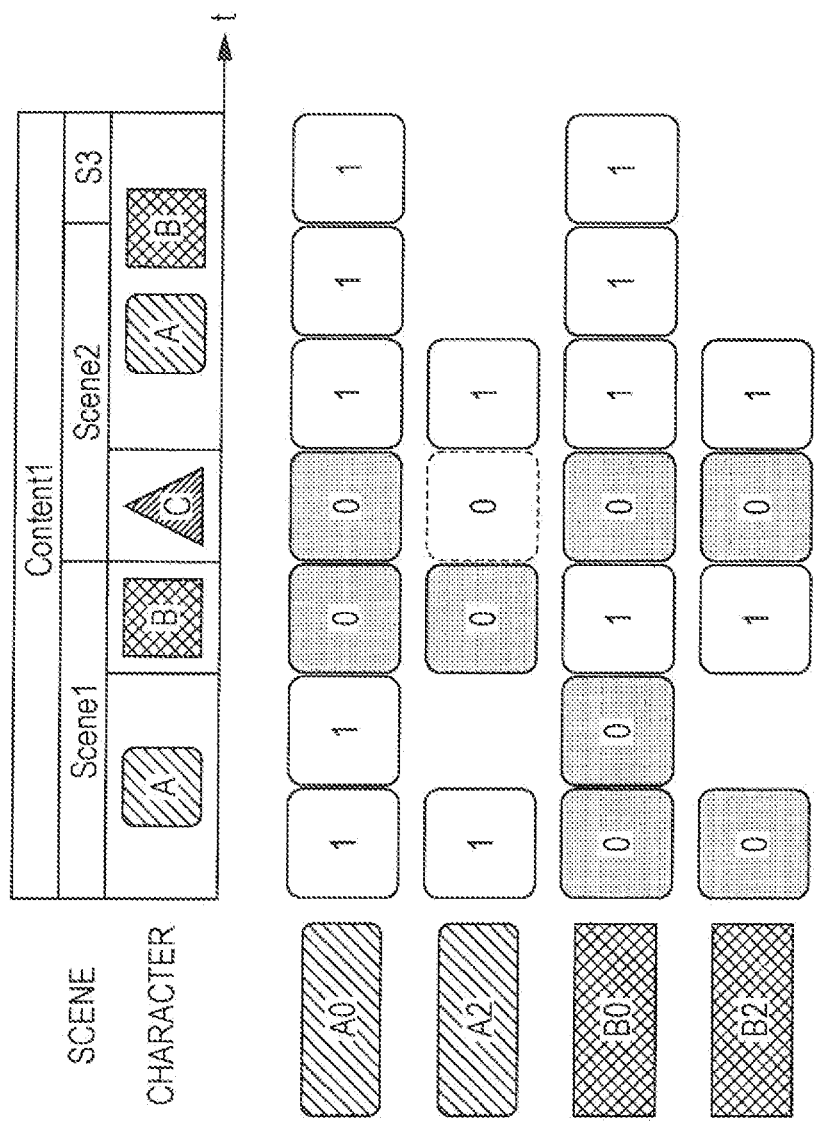
FIG. 9 is a diagram showing an example of an appearance pattern of the video content 1 which is compressed without being delimited by scene unit.

FIG. 9 shows the appearance patterns A2 and B2, which are obtained by delimiting by scene unit and compressing the appearance patterns A0 and B0 of the video content 1 shown in FIG. 3. The appearance patterns A2 and B2 of the video content 1 are as follows.

$A2$ of Content1={1,0,1}

$B2$ of Content1={0,1,0,1}

Here, since the data numbers of the appearance pattern A2 and the appearance pattern B2 of the video content 1 differ after compression, the search target pattern generation unit 22 generates an appearance pattern A2' in which the element number of the appearance pattern A2 with a low data number is matched with the element number of the appearance pattern B2 with a high data number. Specifically, as shown using a broken line in FIG. 9, the search pattern generation unit 21 generates the appearance pattern A2' by inserting the value ("0") from before the compression to the location of an element of the appearance pattern A2 which is missing in relation to the appearance pattern B2.

$A2'$ of Content1={1,0,0,1}

Figure 10:
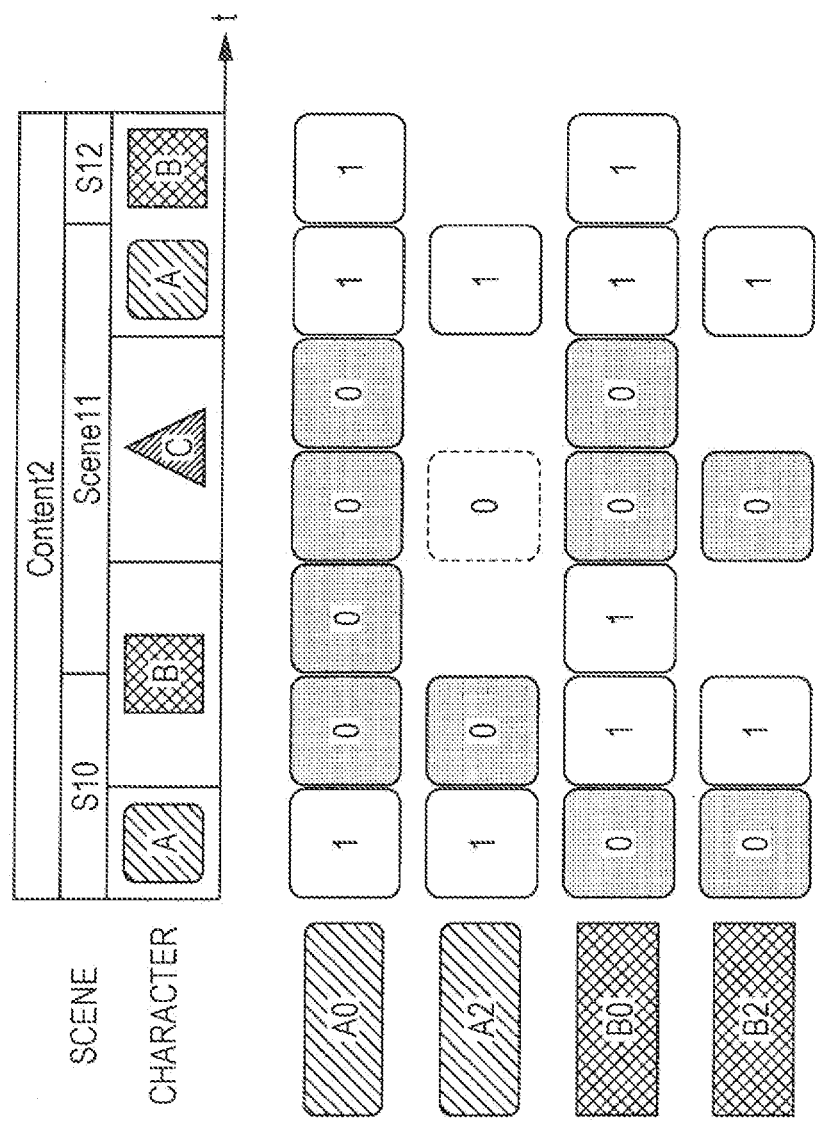
FIG. 10 is a diagram showing an example of an appearance pattern of the video content 2 which is compressed without being delimited by scene unit.

FIG. 10 shows the appearance patterns A2 and B2, which are obtained without delimiting by scene unit by compressing the appearance patterns A0 and B0 of the video content 2 shown in FIG. 4. The appearance patterns A2 and B2 of the video content 2 are as follows.

$A2$ of Content2={1,0,1}

$B2$ of Content2={0,1,0,1}

Since the data number of the appearance pattern A2 of the video content 2 is also lower than the appearance pattern B2, the search pattern generation unit 21 generates the appearance pattern A2' in which the data number thereof is matched with that of the appearance pattern B2.

$A2'$ of Content2={1,0,0,1}

FIG. 11 shows both the appearance patterns A2' and B2 of the video content 1 after adjustment of the data number, and the appearance patterns A2' and B2 of the video content 2 after adjustment of the data number.

The appearance patterns of all three scenes 10 to 12 of the video content 2 which serve as the search pattern are as follows.

$A2'$ and $B2$ of Content2={{1,0,0,1}{0,1,0,1}}

The appearance patterns of all three scenes 1 to 3 of the video content 1 which serve as the search target pattern are as follows.

$A2'$ and $B2$ of Content1={{1,0,0,1}{0,1,0,1}}

Accordingly, this results in Comp(A2' and B2 of Content1, A2' and B2 of Content2)=100%. Therefore, the evaluation unit 23 can decide all three scenes, scene 1 to 3, of the video content 1 to be similar scenes to all three scenes, scene 10 to 12, of the video content 2.

As described above, the image processing device 1 searches for a similar scene or video content by using the appearance patterns of characters, which serve as temporal information of the video content, as feature values. According to the image processing device 1, in comparison with the similar scene detection of the related art which uses color space information of the image as the feature values, it is possible to realize a reduction in the data size of the feature values and a reduction in the computational load.

In addition, since it is possible to arbitrarily set the extraction interval of the still images of the still image time series data which serves as the basis for generating the appearance patterns, it is possible to arrange the feature values of video contents by an arbitrary granularity, which contributes to efficiency improvements to the data access.

Noise Removal

When a scene of the video content changes rapidly, the appearance patterns also change in a fine manner. These fine changes can become noise in the context of the similar scene searching, because they may be elements which are determined to be different scenes (not a similar scene). Therefore, it is possible to improve the search accuracy by adding noise removal.

Figure 12:
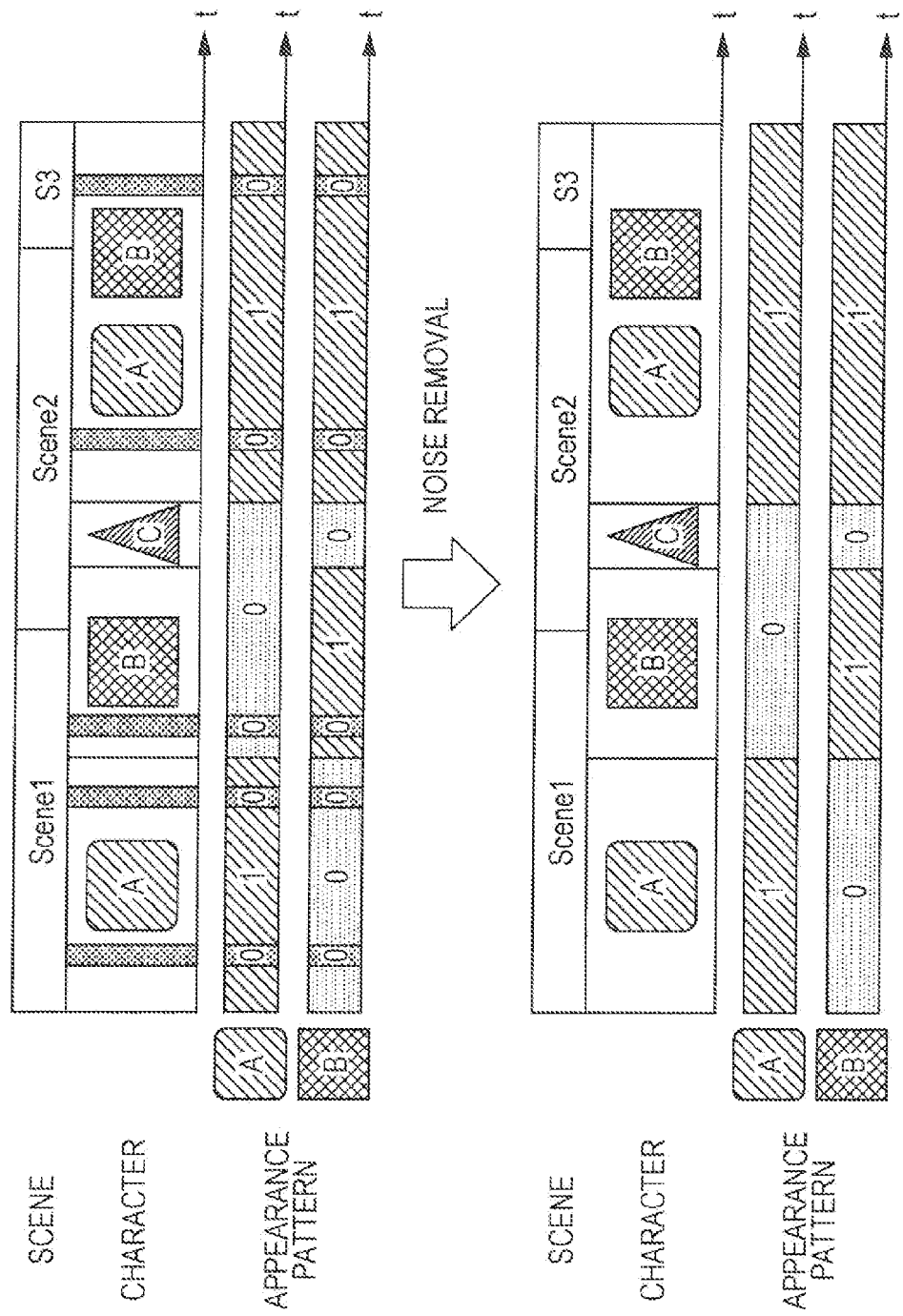
FIG. 12 is a diagram showing an example of noise removal.

FIG. 12 shows an example of the noise removal which the image processing device 1 performs. The upper side of FIG. 12 shows the still image time series data of the video content and the appearance pattern thereof before noise removal. Further, the lower side of FIG. 12 shows the still image time series data of the video content and the appearance pattern thereof after noise removal.

For example, the scene 1 of the video content before noise removal shows that "the first half starts from "Mr. A", "Mr. A" disappears momentarily at two seconds elapsed and eight seconds elapsed, in the latter half, the character switches from "Mr. A" to "Mr. B", and "Mr. B" disappears momentarily at one second elapsed from the appearance of "Mr. B"".

The scene 1 of the video content after noise removal shows that ""Mr. A" appears in the first half, "Mr. B" appears in the latter half", thereby the scene 1 is summarized. In this manner, the fine changes in the appearance pattern of the video content are omitted and the video content is summarized by approximate representation. Therefore, it becomes possible to detect more similar scenes.

Figure 13:
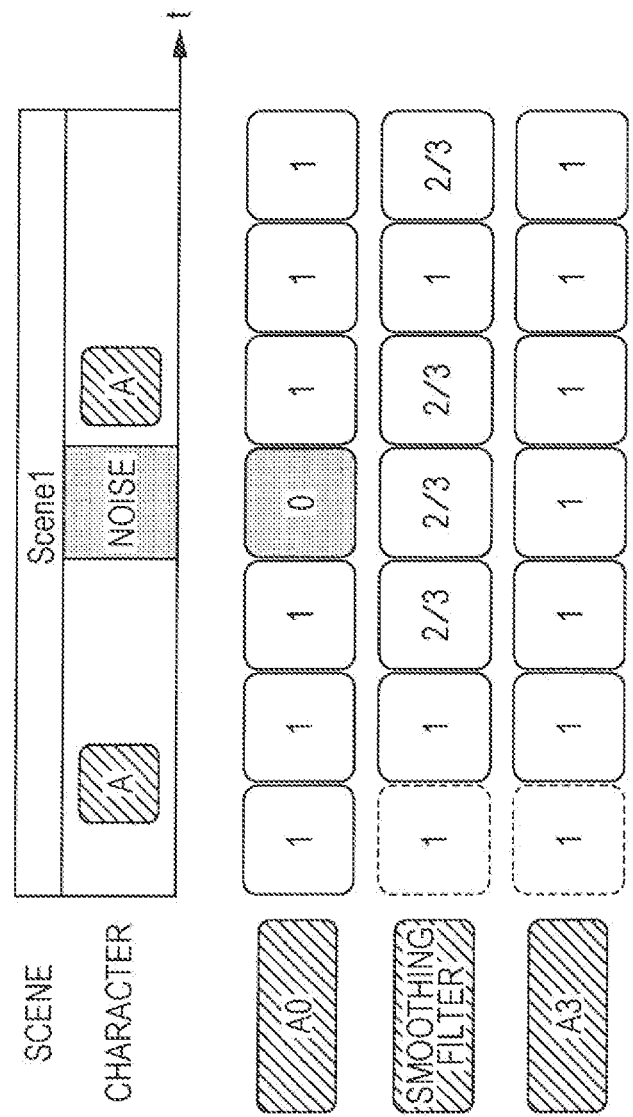
FIG. 13 is a diagram showing an example of noise removal.

FIG. 13 shows a specific method of noise removal.

It is possible to use a smoothing filter for the noise removal. FIG. 13 shows an example of noise removal in a case in which the filter tap number is set to "3" in relation to the appearance pattern A0 of the scene 1 of a particular video content.

A smoothing filter with a filter tap number of "3" is applied to the appearance pattern A0, and the filtered data is rounded off to the nearest whole number. Therefore, the appearance pattern A3 after noise removal is obtained.

Process Flow of Metadata Generation

Figure 14:
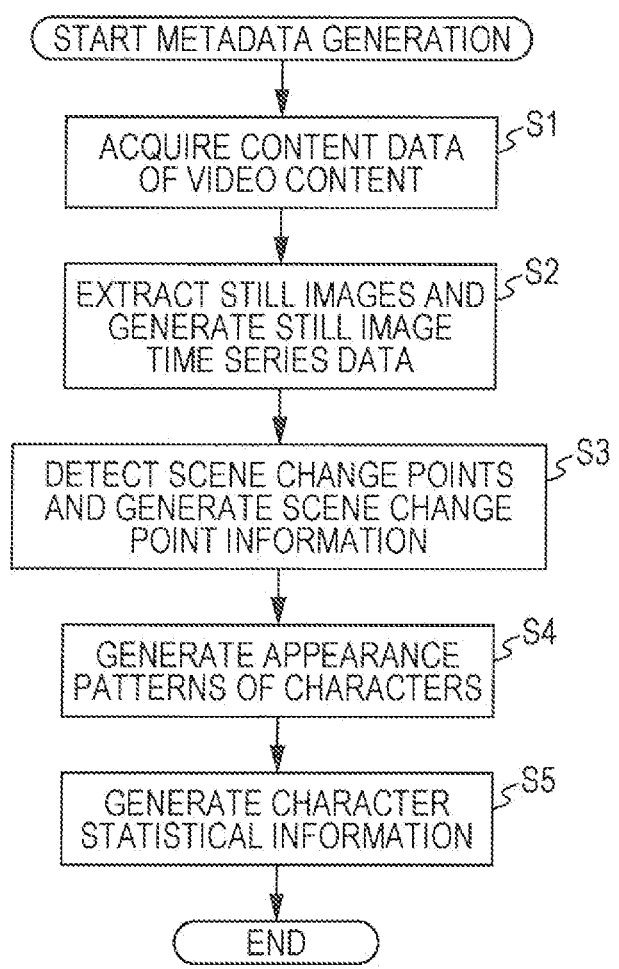
FIG. 14 is a flowchart illustrating metadata generation.

Next, with reference to the flowchart of FIG. 14, description will be given of the metadata generation which generates the metadata of the video content, where the metadata generation is executed in a case in which the video content of the image processing device 1 is input.

First, in step S1, the image acquisition unit 11 acquires content data of the video content, stores the content data of the acquired content data of the video content in the content DB 13A of the storage unit 13, and supplies the content data to the metadata generation unit 12.

In step S2, the still image extraction unit 41 of the metadata generation unit 12 extracts a still image at a constant time interval from the content data of the video content, and generates still image time series data which is formed from a plurality of still images which summarize the video content.

In step S3, the scene change point detection unit 42 detects scene change points in the still image time series data, generates the scene change point information and supplies the scene change point information to the metadata DB 13B of the storage unit 13. Further, the scene change point detection unit 42 causes the storage unit 13 to store the scene change point information.

In step S4, the feature value extraction unit 43 extracts the feature values of the video content. Specifically, the feature value extraction unit 43 generates, for each character, an appearance pattern which is time series data which represents the appearance of a person in the still image time series data, and supplies the appearance patterns to the metadata DB 13B of the storage unit 13. Further, the feature value extraction unit 43 causes the storage unit 13 to store the appearance patterns.

Furthermore, in the generation of the appearance patterns in step S4, it is possible to perform compression or noise removal on the appearance patterns described above as necessary. For example, the setting screen displayed on the display unit 15 may be configured such that it is possible to specify whether to perform compression, whether to perform the process by scene units, the filter tap number of the noise removal, and the like. Therefore, it is possible to perform compression and noise removal on a basis of the specified conditions.

Alternatively, since it is considered that the noise is low when the compression ratio is high, and that the noise is great when the compression ratio is low, when the compression ratio is high, the filter tap number is reduced, and when the compression ratio is low, the filter tap number is increased. In this manner, the feature value extraction unit 43 may automatically control the filter tap number.

Furthermore, even in a case in which the compression or the noise removal is performed, it is desirable to save the appearance pattern before processing in the metadata DB 13B. Accordingly, when searching for a similar scene or the like, it is possible to perform the compression, noise reduction or the like as necessary.

In step S5, the statistical information calculation unit 44 calculates the character statistical information, that is, the person appearance ratio and the appearance ratio of each character, on a basis of the appearance pattern extracted by the feature value extraction unit 43. Furthermore, the statistical information calculation unit 44 supplies the calculated character statistical information to the metadata DB 13B of the storage unit 13. Further, the statistical information calculation unit 44 causes the storage unit 13 to store the character statistical information.

According to the above, the metadata generation ends.

Figure 15:
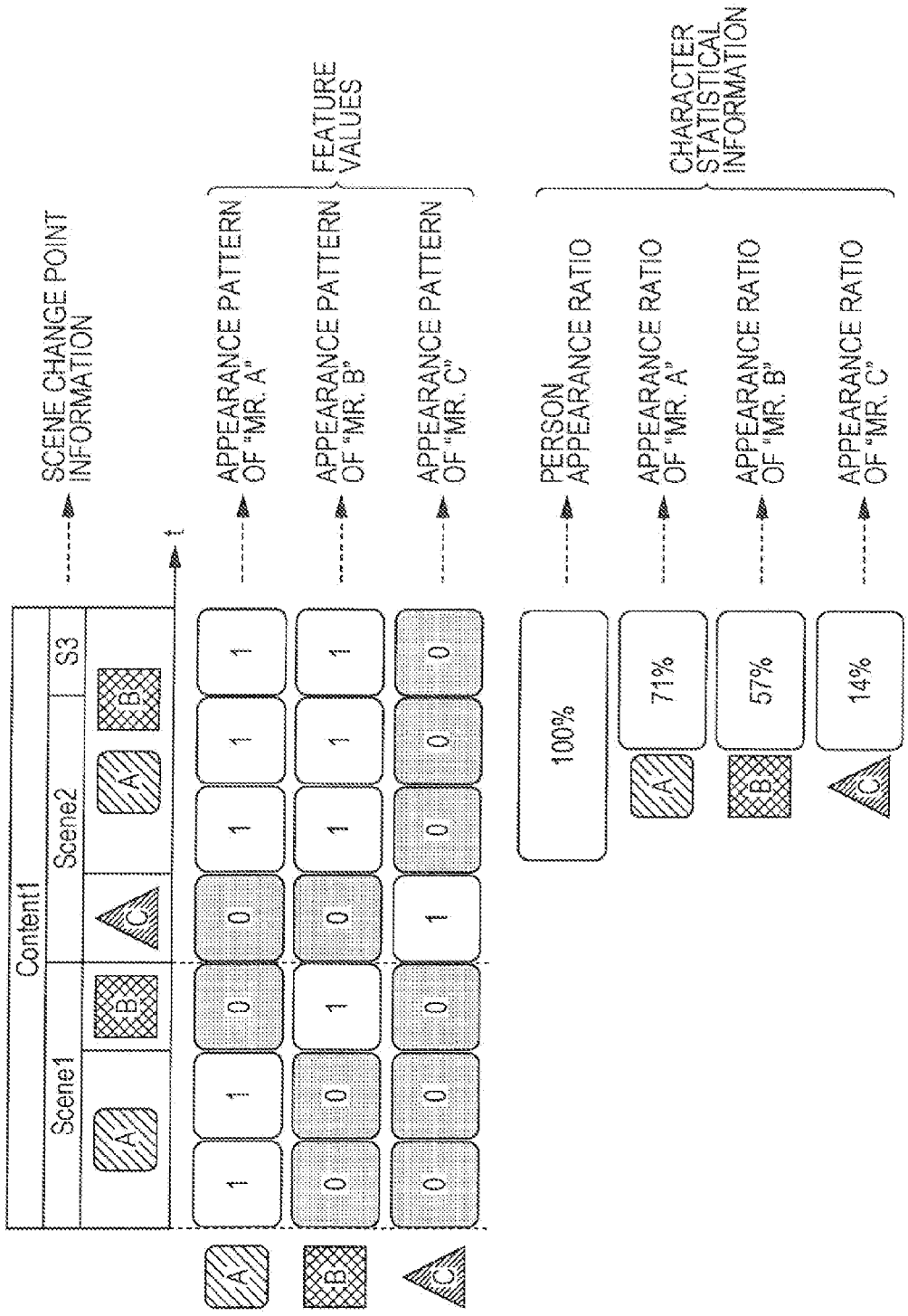
FIG. 15 is a diagram showing an example of metadata.

FIG. 15 shows the metadata generated by the metadata generation, in relation to the video content 1 shown in FIG. 3.

In the example of the video content 1 shown in FIG. 15, persons appear in all seven of the seven still image time series data. Therefore, the person appearance ratio is 7/7=100%.

In relation to the appearance ratio of each character, "Mr. A" appears in five of the seven still images in which persons appear. Therefore, the appearance ratio of "Mr. A" is 5/7=71%. In addition, "Mr. B" appears in four of the still images. Therefore, the appearance ratio to "Mr. B" is 4/7=57%. Further, "Mr. C" appears in one of the still images. Therefore, the appearance ratio to "Mr. C" is 1/7=14%.

Process Flow of Similar Scene Searching

Next, with reference to the flowchart of FIG. 16, description will be given of the similar scene searching which searches for a similar scene of the other video content which is similar to a predetermined scene of the video content stored in the content DB 13A.

First, in step S21, the search process unit 14 executes the search pattern generation which generates the appearance patterns of the scene to be searched for which is specified by the user. The search pattern generation will be described below in detail with reference to FIG. 17.

In step S22, the search process unit 14 executes the search target pattern generation which generates the search target patterns which are the appearance patterns of the video content to be the search target. The search target pattern generation will be described below in detail with reference to FIG. 21.

In step S23, the evaluation unit 23 of the search process unit 14 calculates the degree of similarity between the search pattern and the search target pattern, and decides the similar scenes on a basis of a threshold value which is set in advance. Since a plurality of the search target patterns are generated, the evaluation unit 23 calculates the search pattern and the degree of similarity for each of the plurality of search target patterns.

In step S24, the display control unit 24 causes the display unit 15 to display the similar scenes decided by the evaluation unit 23.

Process Flow of Search Pattern Generation

Figure 16:
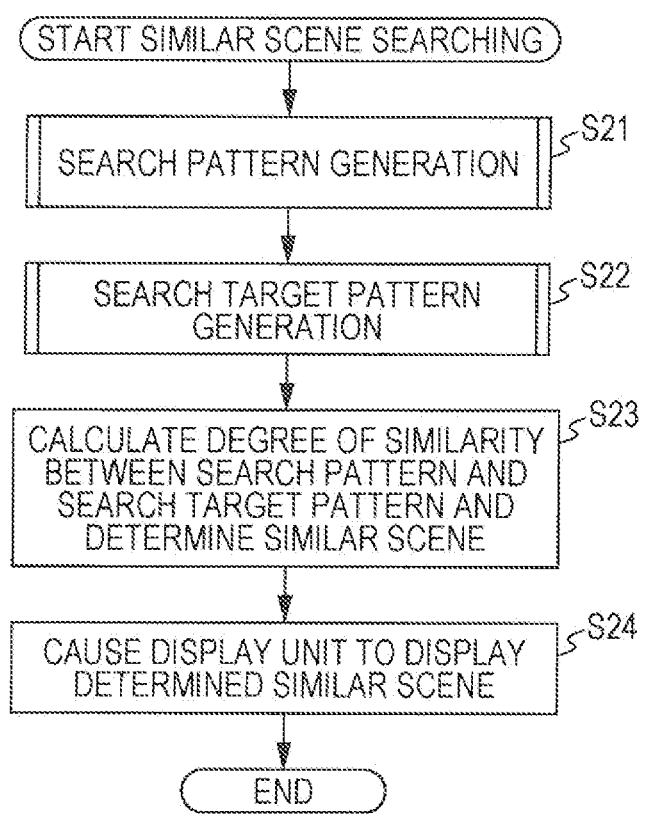
FIG. 16 is a flowchart illustrating similar scene searching.
Figure 17:
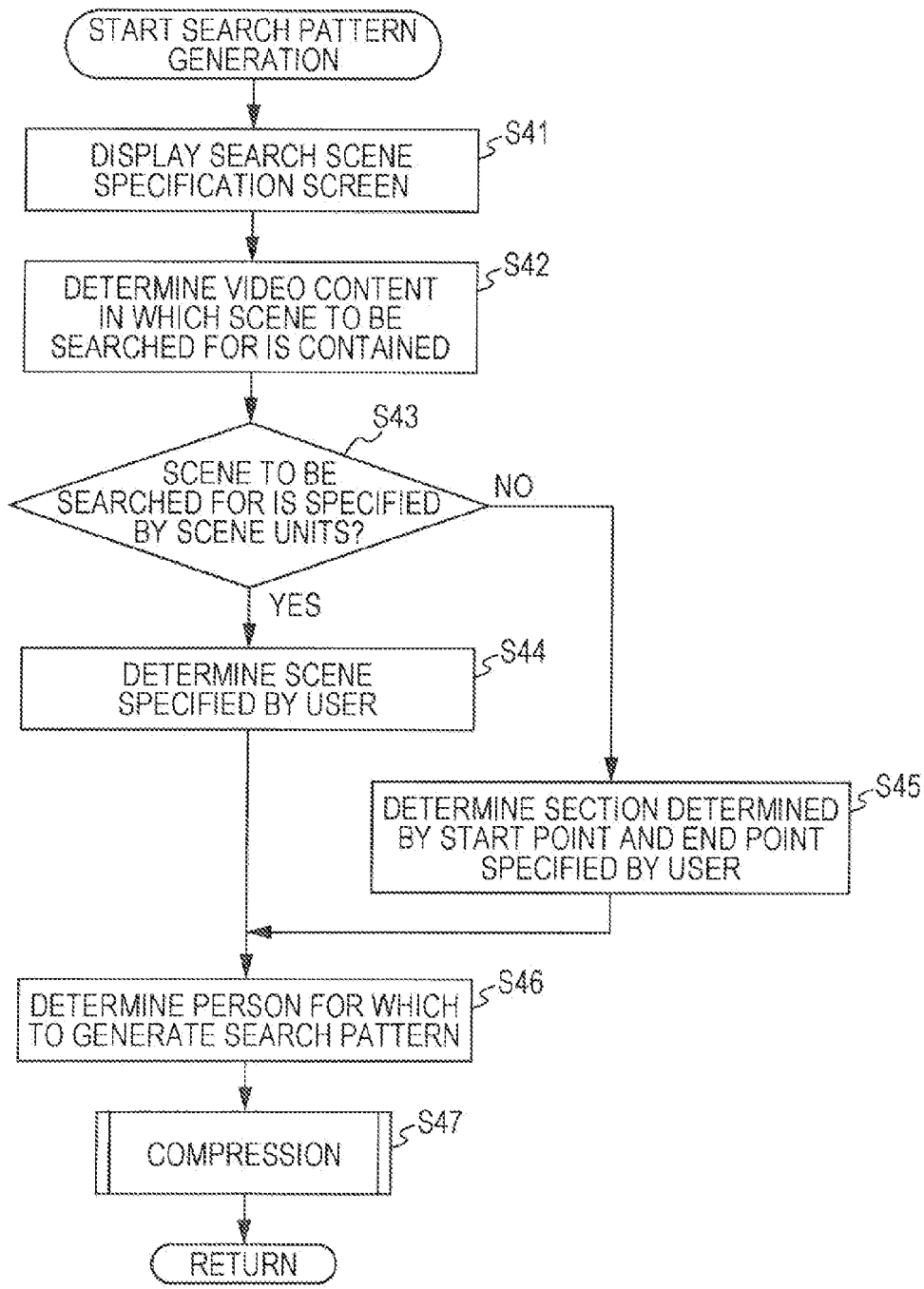
FIG. 17 is a flowchart illustrating search pattern generation in detail.

FIG. 17 is a flowchart showing the details of the search pattern generation which is executed as step S21 of FIG. 16.

In step S41, the display control unit 24 causes the display unit 15 to display the search scene specification screen in order to allow the user to specify the scene to be searched for.

FIG. 18 shows an example of the search scene specification screen displayed on the display unit 15.

Each item of metadata is displayed on the search scene specification screen, for each video content stored in the content DB 13A on a basis of the metadata of each of the video contents stored in the metadata DB 13B. Specifically, for each of the video contents, the display unit 15 displays a content name 61, a person appearance ratio 62, an appearance ratio 63 of each character, scene configuration information 64 on a basis of the scene change point information, and an appearance pattern 65 of each character. A subscript character corresponding to the video content is provided on the lower right of the reference numerals of each item in FIG. 18.

The user who views the search scene specification screen displayed on the display unit 15 operates the operation unit 16 and selects the video content containing the scene to be searched for.

In step S42, the search pattern generation unit 21 determines the video content containing the scene to be searched for which is specified by the user via the operation unit 16.

Figure 19A:
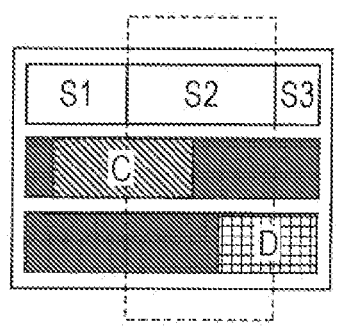
Figure 19B:
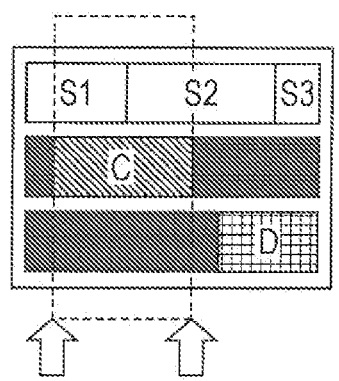

Next, the user operates the operation unit 16 and specifies the scene to be searched for from within the selected video content. As shown in FIG. 19A, the scene to be searched for may also be specified by scene units, and as shown in FIG. 19B, it is also possible to specify a start point and an end point regardless of the scene units.

Furthermore, in step S43, the search pattern generation unit 21 determines whether or not the scene to be searched for is specified by scene units.

In step S43, in a case in which it is determined that specification is made by scene units, the process proceeds to step S44 and the search pattern generation unit 21 determines the scene (the section by scene unit) which is specified by the user.

Meanwhile, in step S43, in a case in which it is determined that specification is not made by scene units, the process proceeds to step S45 and the search pattern generation unit 21 determines the section (the scene) which is decided by the start point and the end point specified by the user.

Furthermore, in step S46, the search pattern generation unit 21 determines the person for which to generate the search pattern from the appearance patterns of the characters contained in the specified scene (the section) of the specified video content.

For example, as shown in FIG. 19A, when the scene 2 is specified as the scene to be searched for, the two characters, "Mr. C" and "Mr. D", are present in the scene 2. In this case, it is possible to use the appearance pattern of only "Mr. C" or "Mr. D" as the search pattern, and it is also possible to use the appearance patterns of both "Mr. C" and "Mr. D" as the search pattern. Therefore, the search pattern generation unit 21 allows the user to select the person. However, as described above, the precision of the similar scene may be increased more by using the appearance patterns of two persons than by using the appearance pattern of one person.

Meanwhile, as shown in FIG. 19B, in a case in which a scene, in which only one person ("Mr. C") appears, is specified as the scene to be searched for, the search pattern generation unit 21 determines that that person is the person for which to generate the search pattern.

In step S47, the search pattern generation unit 21 acquires the appearance pattern of the person of the scene to be searched for which is determined in steps S42 to S46 from the metadata DB 13B, and performs the compression. The appearance patterns after the compression are supplied to the evaluation unit 23 as the search patterns, and the search pattern generation ends. Furthermore, the process returns to FIG. 16.

Furthermore, the noise removal described above may also be performed between the processes of step S46 and step S47.

Process Flow of Compression

Figure 20:
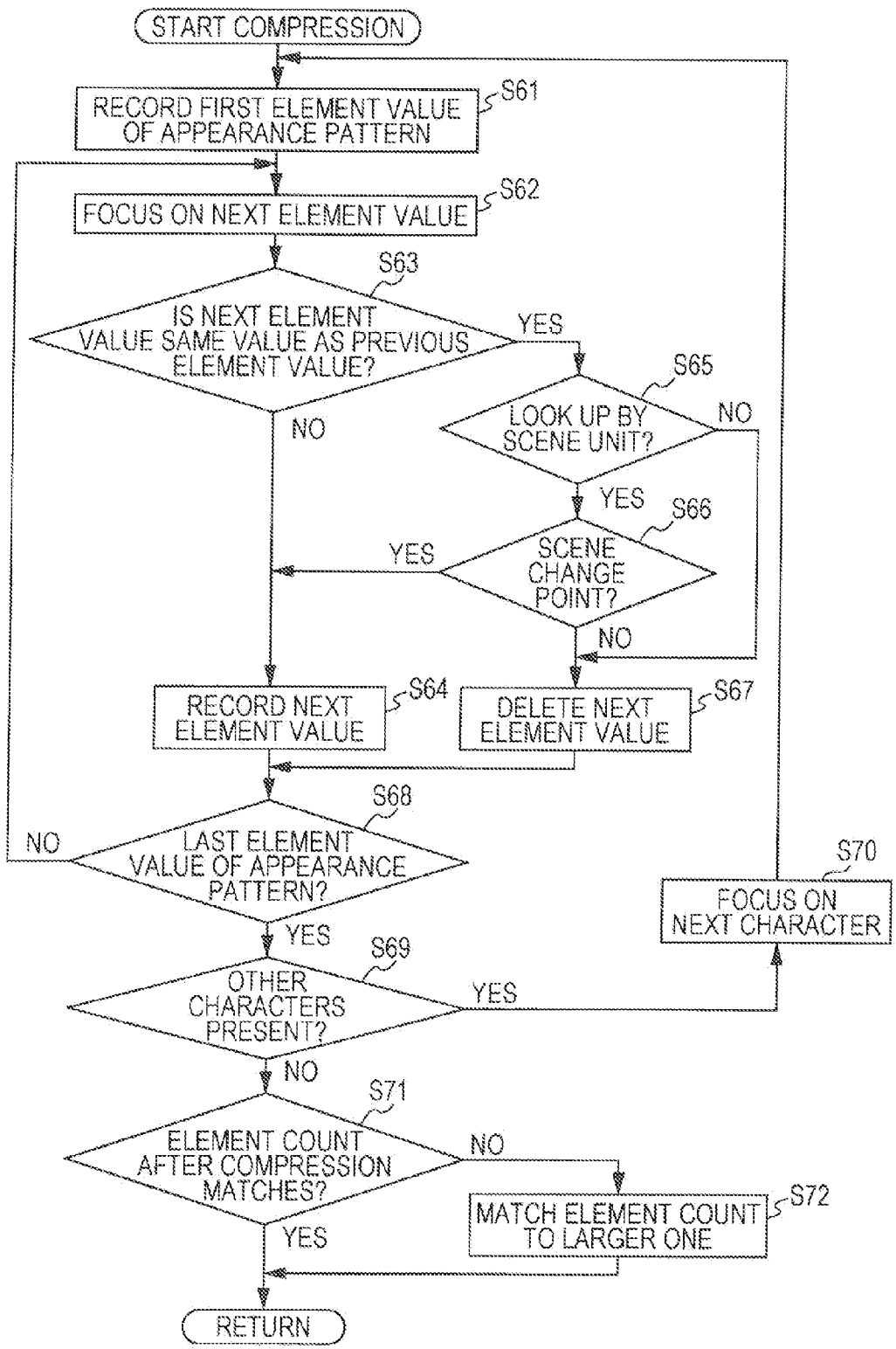
FIG. 20 is a flowchart illustrating the compression in detail.

Next, the compression in step S47 of FIG. 17 will be described in detail with reference to the flowchart of FIG. 20.

First, in step S61, the search pattern generation unit 21 records, as an element of the appearance pattern after compression, the first element value (0 or 1) of the appearance pattern of the scene to be searched for which is specified by the user. In a case in which a plurality of the characters are present, the process in step S61 is executed in relation to one character.

Furthermore, in step S62, the search pattern generation unit 21 focuses on the next element value, and in step S63, the search pattern generation unit 21 determines whether or not the next element value which is focused on is the same value as the previous element value.

In step S63, in a case in which the next element value is determined to be not the same value as the previous element value, in other words, in a case in which the next element value is "0" when the previous element value is "1" or in which the next element value is "1" when the previous element value is "0", the process proceeds to step S64 and the search pattern generation unit 21 records the next element value as an element of the appearance pattern after compression.

Meanwhile, in step S63, in a case in which it is determined that the next element value is the same as the previous element value, the process proceeds to step S65 and the search pattern generation unit 21 determines whether or not the lookup is by scene unit, in other words, whether or not the scene to be searched for is specified by scene units.

In step S65, in a case in which it is determined that the lookup is by scene units, the process proceeds to step S66 and the search pattern generation unit 21 determines whether or not the delimitation between the next element value and the previous element value is a scene change point.

In step S66, in a case in which the delimitation between the next element value and the previous element value is determined to be a scene change point, the process proceeds to step S64 described above. Accordingly, in a case in which the lookup is by scene units, the element value of a change in the scene is recorded even when the same element value continues.

Meanwhile, in step S66, in a case in which the delimitation between the next element value and the previous element value is determined to not be a scene change point, the process proceeds to step S67. In addition, in step S65, in a case in which it has been determined that the lookup is not by scene units, the process proceeds to step S67.

Furthermore, in step S67, the search pattern generation unit 21 deletes the next element value from the elements of the appearance pattern after compression.

Next, in step S68, the search pattern generation unit 21 determines whether or not the element value just focused on is the last element value of the appearance pattern.

In step S68, in a case in which it is determined that the element value just focused on is not the last element value of the appearance pattern, the process returns to step S62. As a result, the next element value is focused on and the same process as described above is executed again.

Meanwhile, in step S68, in a case in which it is determined that the element value just focused on is the last element value of the appearance pattern, the process proceeds to step S69 and the search pattern generation unit 21 determines whether or not there is another character which is not yet compressed, from within the characters specified by the user.

In step S69, in a case in which it is determined that there is another character which is not yet compressed, the process proceeds to step S70, the search pattern generation unit 21 focuses on the next character, and the process proceeds to step S61. Accordingly, the processes of steps S61 to S69 described above are executed in relation to the appearance pattern of the next character.

Meanwhile, in step S69, in a case in which it is determined that there is not another character which is not yet compressed, the process proceeds to step S71, the search pattern generation unit 21 determines whether or not the element number after compression matches for each of the characters.

In step S71, in a case in which it is determined that the element number after compression matches for each character, the process returns to FIG. 17. Furthermore, even in a case in which there is one character, it is determined that the element number matches.

Meanwhile, in step S71, in a case in which it is determined that the element number after compression does not match for each character, the process proceeds to step S72. Further, as described with reference to FIG. 9 and FIG. 10, the search pattern generation unit 21 executes the process of matching the element number with the highest element number, and the process returns to FIG. 17.

According to the search pattern generation described above, the search pattern, which is the appearance pattern of the scene to be searched for specified by the user, is generated.

Process Flow of Search Target Pattern Generation

Next, the search target pattern generation in step S22 of FIG. 16 will be described in detail with reference to the flowchart of FIG. 21.

First, in step S81, the search target pattern generation unit 22 searches for video contents in which the same character emerges as in the search pattern generated by the search pattern generation on a basis of the character statistical information of the metadata DB 13B, and selects one of the detected video contents. In this process, when the search pattern is configured by the appearance patterns of "Mr. A" and "Mr. B", video contents in which persons other than "Mr. A" and "Mr. B" appear are excluded from the search targets. Accordingly, it is possible to restrict the scope of the lookup to video contents in which the same characters emerge, and to perform the search efficiently.

In step S82, the search target pattern generation unit 22 acquires the appearance pattern of the video content selected in step S81 from the metadata DB 13B.

In step S83, the search target pattern generation unit 22 performs compression on the appearance pattern of the acquired video content. The compression is the same as the process described with reference to FIG. 20.

In step S84, the search target pattern generation unit 22 determines whether or not there are still video contents in which the same character emerges as in the search pattern on a basis of the character statistical information of the metadata DB 13B, and in a case in which it is determined that there still are such contents, the process returns to step S81. Accordingly, in step S81 onward, the next video content in which the same character emerges as in the search pattern is selected, and the search target pattern in relation to the selected video content is generated.

Meanwhile, in step S84, in a case in which it is determined that there is no video content in which the same character emerges as in the search pattern, the search target pattern process ends and the process returns to FIG. 16.

Figure 21:
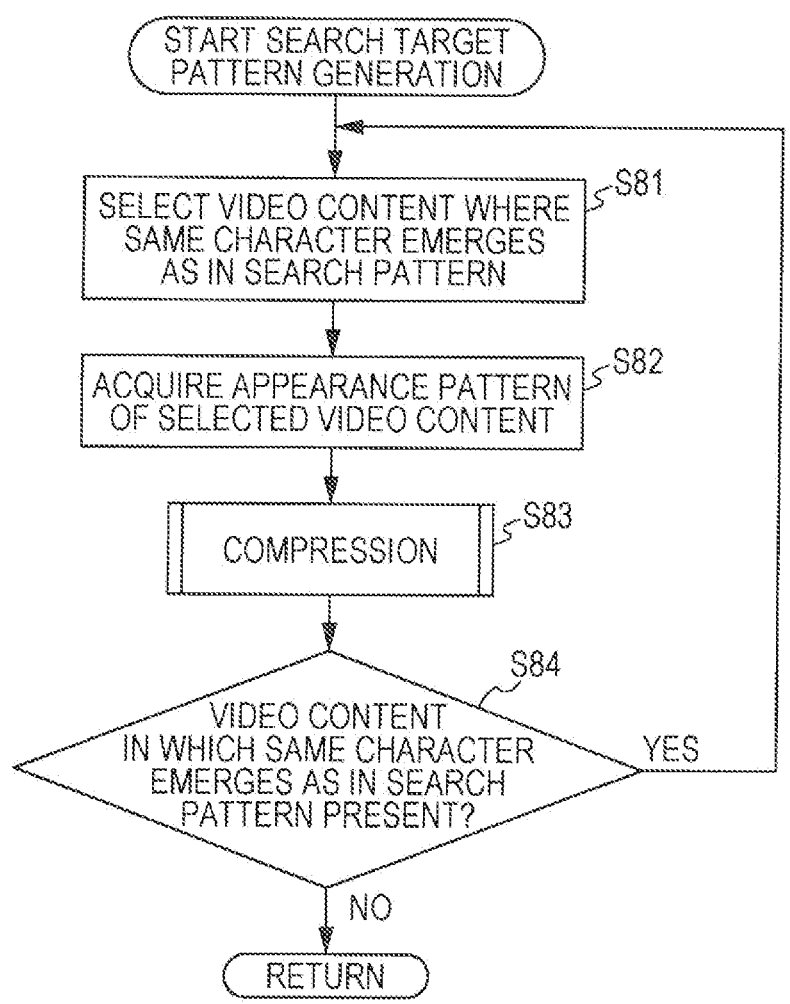
FIG. 21 is a flowchart illustrating a search target pattern generation in detail.

The search target pattern generation of FIG. 21 is a processing example of a case in which all the contents of all the video contents, which differ from the video content in which the user specified the scene to be searched for, are set as the scope of the lookup. However, it is also possible to specify a portion of the video content as the scope of the lookup. In this case, a process of receiving a specification of the scope of the lookup such as that of steps S43 to S45 of FIG. 17 is added between step S82 and step S83.

In addition, the noise removal described above may also be performed between step S82 and step S83.

In the example described above, the scope of the lookup is restricted to video contents in which the same characters emerge by the process of step S1, and the lookup of similar scenes is performed efficiently.

However, there is also a method in which the process of step S81 is omitted. In this case, it is possible to detect a scene in which the appearance pattern of another character is similar as a similar scene. In addition, even in a case in which the same person is recognized as a different person by the face image recognition, when the appearance pattern is similar, it is possible to detect the scene as a similar scene.

Example of Adapted Method of Searching

Next, the example of an adapted method of searching will be described.

Figure 22:
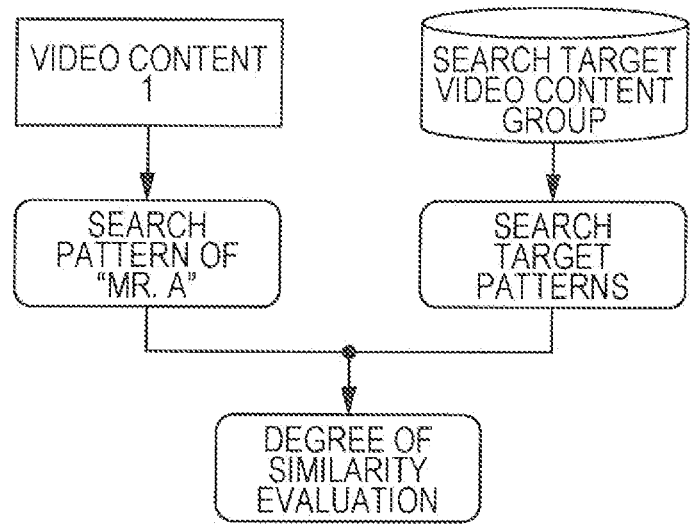
FIG. 22 is a schematic diagram illustrating the normal method of searching.

In the example described above, as shown in FIG. 22, the image processing device 1 generates a search pattern formed from the appearance patterns of one or more characters contained in one video content (for example, the video content 1), and compares the degree of similarity between the search pattern and the search target pattern of another video content.

Figure 23:
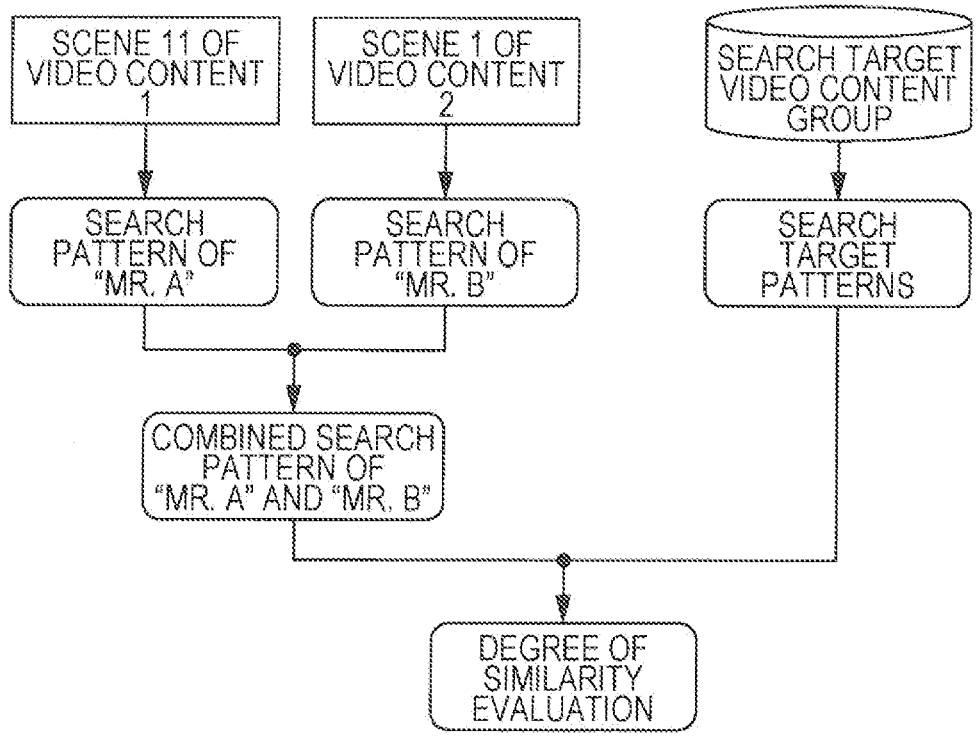
FIG. 23 is a schematic diagram illustrating an adapted method of searching.

In addition to this method of searching, the image processing device 1 may generate a combined search pattern in which the appearance patterns of characters of different contents and scenes are combined, and may compare the degree of similarity between the combined search pattern and the search target patterns of the other video contents. For example, as shown in FIG. 23, the image processing device 1 may generate a combined search pattern for "Mr. A" and "Mr. B" in which the search pattern of "Mr. A" of the scene 11 of the video content 1 and the search pattern of "Mr. B" of the scene 1 of the video content 2 are combined, and may compare the degree of similarity between the combined search pattern and the search target patterns of the other video contents.

According to this method of searching, it is possible to generate a new appearance pattern which would not be generated from only one video content. Therefore, it is possible to search out an unknown scene. In addition, in the identification of the characters by the face image identification unit 43A, in a case in which persons which are actually the same person are recognized as different persons due to the influence of the image quality of the video content, the image quality and the face orientation of the registered face images and the like, there is a case in which it is possible to detect the scene as a similar scene.

Furthermore, in the schematic diagram shown in FIG. 23, only the search patterns are combined, whereas the search target pattern is generated by video content units in the same manner as the example described above. However, in relation to the search target pattern, a combined search target pattern in which the appearance patterns of a plurality of video contents are combined is generated, and it is possible to compare the combined search target pattern with the combined search pattern.

Therefore, next, description will be given of a method in which the degree of similarity between the combined search pattern and the combined search target pattern is compared. Further, the combined search pattern is generated by combining the appearance patterns of a plurality of video contents, and the combined search target pattern is generated by combining the appearance patterns of a plurality of video contents of the search target.

First Combined Comparison Method

Figure 24:
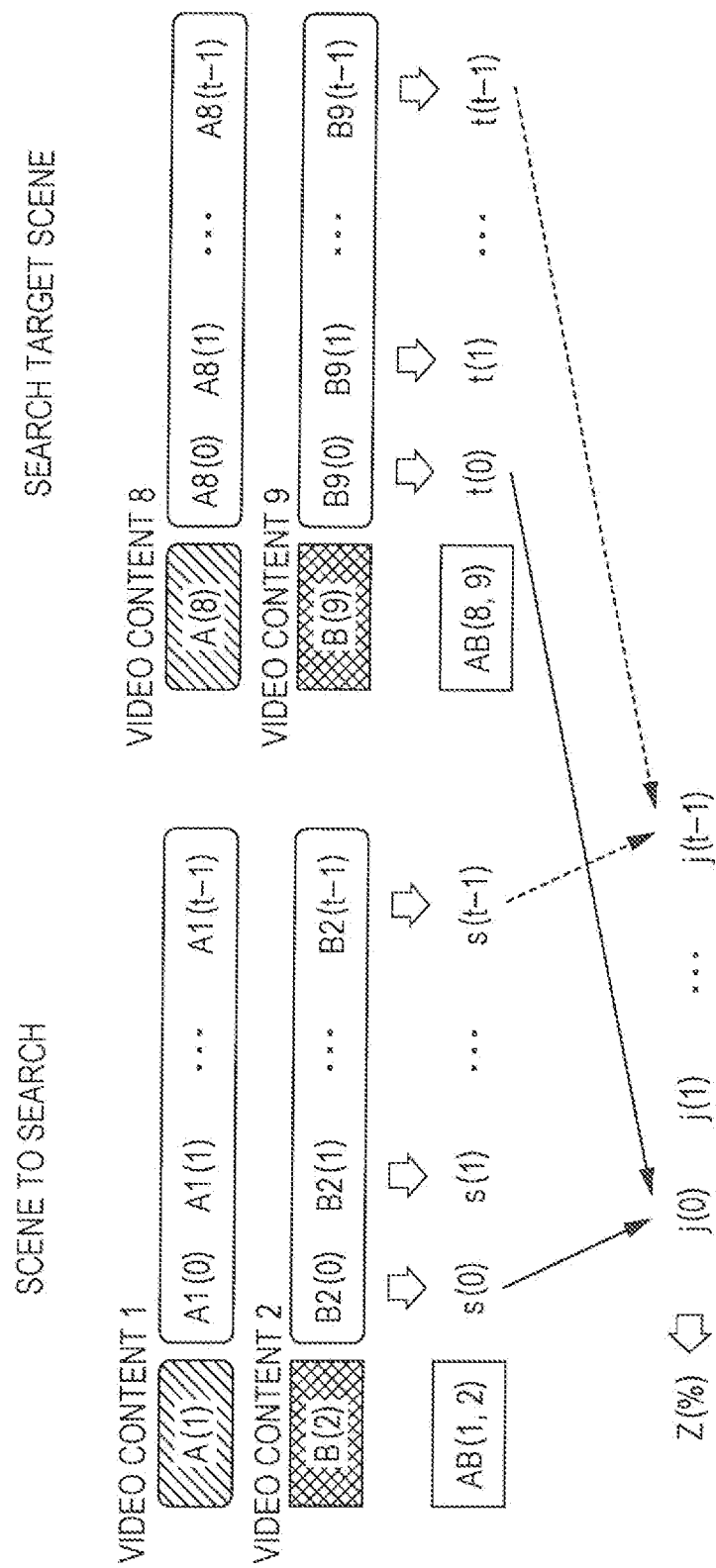
FIG. 24 is a diagram illustrating a first combined comparison method.

FIG. 24 shows the first combined comparison method.

The first combined comparison method is a method in which the combined search pattern and the combined search target pattern are generated using the logical products (the AND operation) of the appearance patterns extracted from the respective pluralities of video contents, and the combined search pattern and the combined search target pattern are compared with one another.

A combined search pattern AB(1, 2) is generated by combining an appearance pattern A(1) of "Mr. A" of a particular scene of the video content 1 and an appearance pattern B(2) of "Mr. B" of a particular scene of the video content 2.

The appearance pattern A(1) is A1(0), A1(1), . . . , A1($t$–1), and the appearance pattern B(2) is B2(0), B2(1), . . . , B2($t$–1). Furthermore, the combined search pattern AB(1, 2) is AB(1, 2)=s(0), s(1), . . . , s(t–1). This is determined by taking the logical product of corresponding times in the appearance pattern A(1) and the appearance pattern B(2). In other words, s(0)=A1(0) AND B2(0), s(1)=A1(1) AND B2(1), . . . , s(t–1)=A1($t$–1) AND B2($t$–1).

In addition, a combined search pattern AB(8, 9) is generated by combining an appearance pattern A(8) of "Mr. A" of a particular scene of the video content 8 and an appearance pattern B(9) of "Mr. B" of a particular scene of the video content 9.

The appearance pattern A(8) is A8(0), A8(1), . . . , A8($t$–1), and the appearance pattern B(9) is B9(0), B9(1), . . . , B9($t$–1). Furthermore, the combined search pattern AB(8, 9) is AB(8, 9)=t(0), t(1), . . . , t(t–1). This is determined by taking the logical product of corresponding times in the appearance pattern A(8) and the appearance pattern B(9). In other words, t(0)=A8(0) AND B9(0), t(1)=A8(1) AND B9(1), . . . , t(t–1)=A8($t$–1) AND B9($t$–1).

Furthermore, in the evaluation unit 23, it is possible to calculate the degree of similarity between the combined search pattern AB(1, 2) and the combined search target pattern AB(8,9) in the following manner.

$$\text{Comp}(AB(1,2), AB(8,9)) = \{\{s(0), s(1), \ldots, s(t-1)\},$$
$$\{t(0), t(1), \ldots, t(t-1)\}\} =$$
$$\{j(0), j(1), \ldots, j(t-1)\} = (j(0) + j(1) + \ldots, + j(t-1)) \times 100/t = z$$

Where j(t)=1 when s(t)=t(t) is true, and j (t)=0 when s(t)=t(t) is not true.

Second Combined Comparison Method

Figure 25:
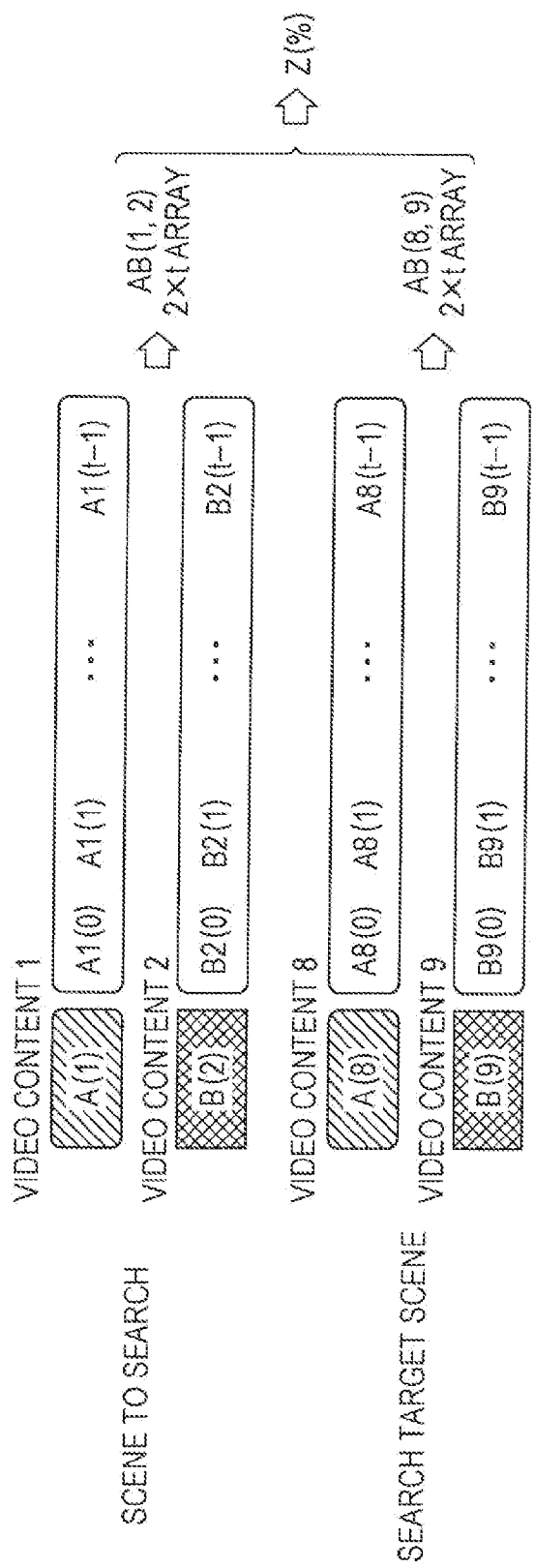
FIG. 25 is a diagram illustrating a second combined comparison method.

FIG. 25 shows the second combined comparison method.

The second combined comparison method is a method in which the appearance patterns of each character extracted from each of a plurality of video contents are considered to have been extracted from one video content, and the comparison is performed in the same manner as the basic method of searching described in FIG. 5.

In other words, the combined search pattern AB(1, 2) and the combined search target pattern AB(8, 9) are each generated as a two row t column appearance pattern as described above.

$$AB(1,2) = \{\{A(1)\}, \{B(2)\}\} =$$
$$\{\{A1(0), A1(1), \ldots, A1(t-1)\}, \{B2(0), B2(1), \ldots, B2(t-1)\}\}$$
$$AB(8,9) = \{\{A(8)\}, \{B(9)\}\} =$$
$$\{\{A8(0), A8(1), \ldots, A8(t-1)\}, \{B9(0), B9(1), \ldots, B9(t-1)\}\}$$

The calculation method of the degree of similarity between the combined search pattern AB(1, 2) and the combined search target pattern AB(8, 9) is the same as the basic method of searching.

Third Combined Comparison Method

Figure 26:
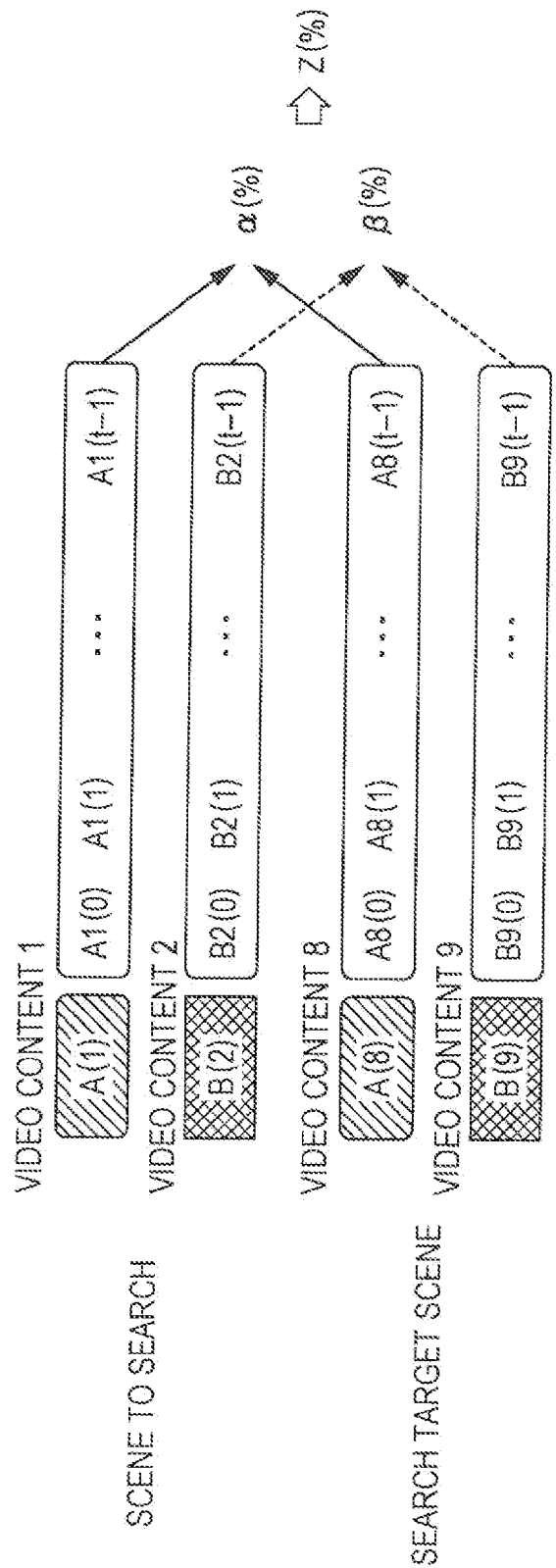
FIG. 26 is a diagram illustrating a third combined comparison method.

FIG. 26 shows the third combined comparison method.

The third combined comparison method does not generate a combined search pattern and a combined search target pattern. However, the third combined comparison method is a method in which, by individually comparing the appearance patterns to be searched for and the appearance patterns of the search targets and integrating the results of the comparison, the degree of similarity is compared as a combined pattern.

In other words, as shown in FIG. 26, first, the degree of similarity Comp(A(1), A(8)) between the appearance pattern A(1) of the video content 1 and the appearance pattern A(8) of the video content 8 is calculated. In addition, the degree of similarity Comp(B(2), B(9)) between the appearance pattern B(2) of the video content 2 and the appearance pattern B(9) of the video content 9 is calculated. Furthermore, the results of these calculations are Comp(A(1), A(8))=α%, Comp(B(2), B(9))=β%.

The evaluation unit 23 calculates the degree of similarity after combination using the following equation. Rateα and Rateβ are the integrated ratios in a case in which the respective calculated degrees of similarity are integrated, and they may be set to an arbitrary value.

$$Z = func\{Comp(A(1), A(8)), Comp(B(2), B(9))\}$$
$$= (\alpha \times Rate\alpha + \beta \times Rate\beta)/2(\text{number of persons})$$

Using the three combined comparison methods described above, it is possible to perform searching for a similar scene in which the appearance patterns of a plurality of video contents are combined.

Furthermore, in the method in which only the search patterns are combined, in the first to third combined comparison methods described above, the appearance pattern A(8) of the video content 8 and the appearance pattern B(9) of the video content 9 may be considered to be from the same video content.

As described above, in the image processing device 1 to which the present disclosure is applied, by using the appearance patterns of characters, which serve as temporal information of the video content, as feature values, it is possible to search for many similar scenes without exception. In the similar scene searching of an embodiment of the present disclosure, of the recall and the precision, which are generally referred to as the search performance of an information searching system, the recall is considered to be important. However, as described above, it is possible to also improve the precision by restricting the scope of the lookup using the character statistical information, processing the appearance patterns using noise removal, and the like.

In the embodiment described above, description is given of an example in which similar scenes are searched for from video contents which differ from the video content of the scene to be searched for. However, it is naturally also possible, to search for similar scenes from the same content as the video content of the scene to be searched for.

In the example described above, the identification of a person is performed using face image recognition. However, it is possible to use another technology than the face image recognition, for example, speaker recognition technology or the like for the method of determining a person for generating an appearance pattern.

Computer Application Example

The series of processes described above may be executed using hardware and may also be executed using software. In a case in which the series of processes is executed using software, the program which configures the software is installed on a computer. Here, the computer includes a computer embedded within dedicated hardware, and an ordinary personal computer or the like which is capable of executing the various functions by installing various programs thereon.

Figure 27:
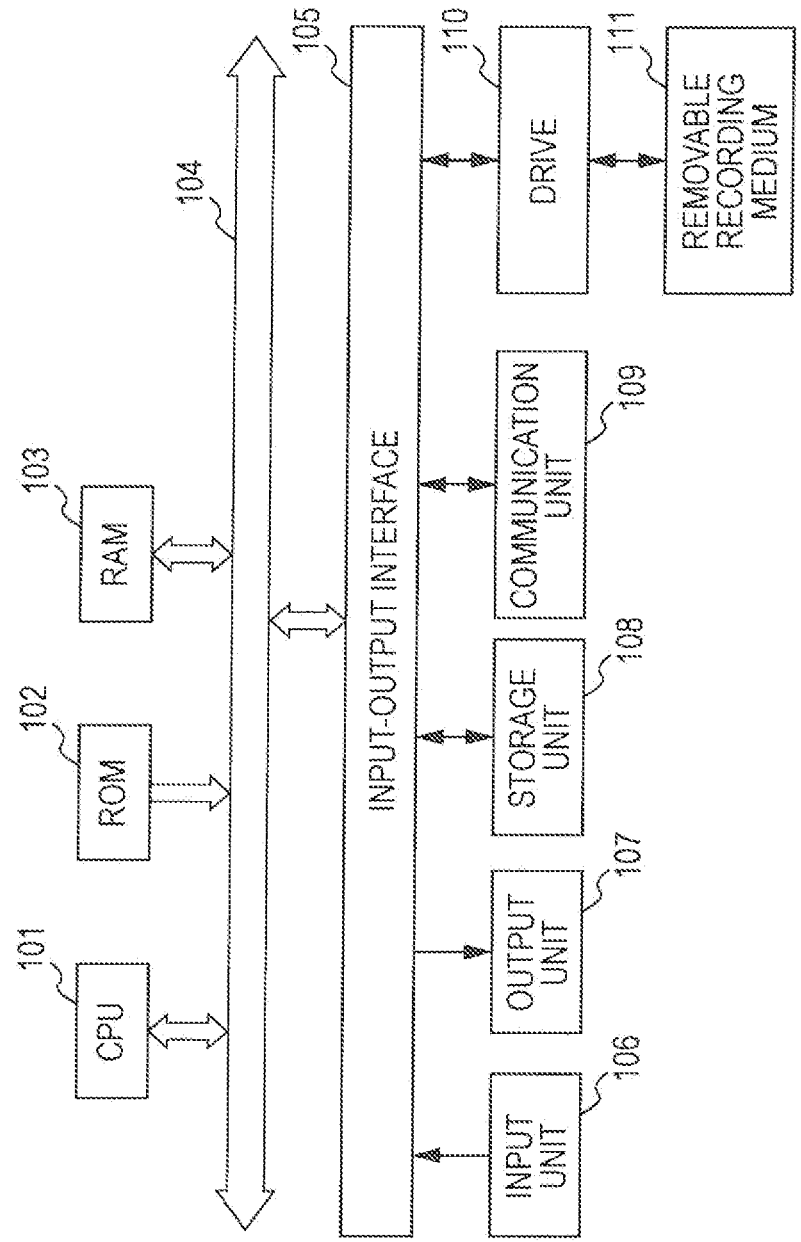
FIG. 27 is a block diagram showing a configuration example of an embodiment of a computer to which the present disclosure has been applied.

FIG. 27 is a block diagram showing an example of the configuration of the hardware of the computer which executes the series of processes described above using a program.

In the computer, a CPU (Central Processing Unit) 101, ROM (Read Only Memory) 102, and RAM (Random Access Memory) 103 are connected to one another by a BUS 104.

An input-output interface 105 is further connected to the bus 104. The input-output interface 105 is connected to an input unit 106, an output unit 107, a storage unit 108, a communication unit 109 and a drive 110.

The input unit 106 is formed from a keyboard, a mouse, a microphone and the like. The output unit 107 is formed from a display, a speaker and the like. The storage unit 108 is formed from a hard disk, non-volatile memory or the like. The communication unit 109 is formed from a network interface or the like. The drive 110 drives a removable recording medium 111 such as a magnetic disk, an optical disk, a magneto-optical disk, or semiconductor memory.

In the computer configured as described above, the series of processes described above are performed by the CPU 101, for example, loading the program stored in the storage unit 108 into the RAM 103 via the input-output interface 105 and the bus 104, and executing the loaded program.

In the computer, it is possible to install the program onto the storage unit 108 via the input-output interface 105 by mounting the removable recording medium 111 into the drive 110. In addition, it is possible to install the program onto the storage unit 108 by receiving the program using the communication unit 109 via a wired or wireless transmission medium such as the local area network, the Internet, or a digital satellite broadcast. Additionally, it is possible to install the program beforehand on the ROM 102 or the storage unit 108.

Furthermore, the program which the computer executes may be a program in which the processes are performed in time series order in the order described in the present specification. The program may also be a program in which the processes are performed in parallel or at the necessary timing such as when the process is called.

The embodiments of the present disclosure are not limited to the embodiment described above, and various modifications may be made within the scope not departing from the spirit of the present disclosure.

For example, it is possible to adopt an embodiment in which all of the plurality of embodiments described above, or a subset thereof, are combined.

For example, in the present disclosure, it is possible to adopt a cloud computing configuration in which one function is distributed, shared and processed by a plurality of devices via a network.

In addition, in addition to executing each of the steps described in the flowchart described above using one device, it is possible to distribute and execute the steps over a plurality of devices.

Furthermore, in a case in which a plurality of processes are contained in one step, in addition to executing the processes on one device, it is possible to distribute and execute the plurality of processes contained in that one step on a plurality of devices.

Furthermore, the present disclosure may adopt the following configurations.

(1) An image processing device includes an evaluation unit which acquires a search pattern which is an appearance pattern of a person in a scene of a video content containing the scene, where a similar scene is to be searched, and a search target pattern which is an appearance pattern of a person in a video content which is to be a search target of the similar scene, calculates a degree of similarity between the search pattern and the search target pattern, and determines the similar scene on a basis of the calculated degree of similarity.

(2) The image processing device according to (1), further includes a search pattern generation unit which generates the search pattern by compressing the appearance pattern of the person obtained from still image time series data, where the still image time series data is extracted at a predetermined time interval from the video content containing the scene; and a search target pattern generation unit which generates the search target pattern by compressing the appearance pattern of the person obtained from still image time series data, where the still image time series data is extracted at a predetermined time interval from the video content to be a search target of the similar scene.

(3) The image processing device according to (2), in which when a predetermined element value which configures the appearance pattern of the person is a same value as the previous element value, the compression is a process which deletes the predetermined element value.

(4) The image processing device according to (2) or (3), in which the compression is performed by scene units on a basis of scene change point information.

(5) The image processing device according to any one of (2) to (4), in which when the element number of the appearance pattern of each character does not match, the element number of the appearance pattern of each character is matched with the element number of the appearance pattern of the character with the highest element number.

(6) The image processing device according to any one of (2) to (5), in which the search pattern generation unit and the search target pattern generation unit perform noise removal on the appearance pattern before performing the compression.

(7) The image processing device according to any one of (2) to (6), in which the search target pattern generation unit acquires character statistical information of a video content capable of becoming a search target of the similar scene, and selects the video content to become the search target of the similar scene on a basis of the acquired character statistical information.

(8) The image processing device according to any one of (2) to (7), in which the search pattern generation unit generates the search pattern by combining the appearance patterns of a plurality of video contents.

(9) The image processing device according to (8), in which the search target pattern generation unit generates the search target pattern by combining the appearance patterns of a plurality of video contents.

(10) The image processing device according to any one of (1) to (9) further includes a metadata generation unit which generates the appearance pattern of a person to be identified by identifying the person from still image time series data, where the still image time series data is a plurality of still images extracted at a predetermined time interval from the video content; and a storage unit which stores the appearance pattern generated by the metadata generation unit.

(11) The image processing device according to (10), in which the metadata generation unit calculates, in relation to the still image time series data, a person appearance ratio and an appearance ratio per character, and the storage unit stores the person appearance ratio and the appearance ratio per character as character statistical information.

(12) The image processing device according to (10) or (11), in which the metadata generation unit detects, in relation to the still image time series data, a scene change point, and the storage unit also stores scene change point information which serves as information of the scene change point.

(13) The image processing device according to any one of (10) to (12), in which the metadata generation unit also compresses the generated appearance pattern of the person.

(14) The image processing device according to any one of (10) to (14), in which the metadata generation unit also performs noise removal on the generated appearance pattern of the person.

(15) An image processing method includes acquiring a search pattern which is an appearance pattern of a person in a scene of a video content containing the scene, where a similar scene is to be searched, and a search target pattern which is an appearance pattern of a person in a video content which is to be a search target of the similar scene, calculating a degree of similarity between the search pattern and the search target pattern, and determining the similar scene on a basis of the calculated degree of similarity.

(16) A program which causes a computer to function as an evaluation unit which acquires a search pattern which is an appearance pattern of a person in a scene of a video content containing the scene, where a similar scene is to be searched, and a search target pattern which is an appearance pattern of a person in a video content which is to be a search target of the similar scene, calculates a degree of similarity between the search pattern and the search target pattern, and determines the similar scene on a basis of the calculated degree of similarity.

The present disclosure contains subject matter related to that disclosed in Japanese Priority Patent Application JP 2012-213526 filed in the Japan Patent Office on Sep. 27, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
an evaluation unit which
acquires a search pattern which is an appearance pattern of an object in a scene of a video content containing that scene, the appearance pattern representing the number of respective still images included in that scene in which the object appears and the number of respective still images included in that scene in which the object does not appear,
the evaluation unit acquires a search target pattern which is an appearance pattern of an object in a video content which is searched for a similar scene, the appearance pattern of the search target pattern representing the number of respective still images included in the scene of the video content which is searched in which the object appears and the number of respective still images included in the scene of the video content which is searched in which the object does not appear, calculates a degree of similarity between the search pattern and the search target pattern, and determines that the scene in the video content which is searched is the similar scene on a basis of the calculated degree of similarity.

2. The image processing device according to claim 1, further comprising:

a search pattern generation unit which generates the search pattern by compressing the appearance pattern of the object obtained from still image time series data, where the still image time series data is extracted at a predetermined time interval from the video content containing the scene; and a search target pattern generation unit which generates the search target pattern by compressing the appearance pattern of the object obtained from still image time series data, where the still image time series data is extracted at a predetermined time interval from the video content to be a search target of the similar scene.

3. The image processing device according to claim 2, wherein the appearance or non-appearance of an object in a respective still image is represented by an element value; and when a predetermined element value in one still image is a same value as the element value in a previous still image, the compression deletes the predetermined element value.

4. The image processing device according to claim 2, wherein the compression is performed by scene units on a basis of scene change point information.

5. The image processing device according to claim 2, wherein the still image time series data comprises a number of still image elements, and wherein when the number of still image elements of the appearance pattern of each object does not match, the still image element of the appearance pattern of each object is matched with the still image element of the appearance pattern of the object with the highest number of still image elements.

6. The image processing device according to claim 2, wherein the search pattern generation unit and the search target pattern generation unit perform noise removal on the appearance pattern before performing the compression.

7. The image processing device according to claim 2, wherein the search target pattern generation unit acquires character statistical information of a video content capable of becoming a search target of the similar scene, and selects the video content to become the search target of the similar scene on a basis of the acquired character statistical information.

8. The image processing device according to claim 2, wherein the search pattern generation unit generates the search pattern by combining the appearance patterns of a plurality of video contents.

9. The image processing device according to claim 8, wherein the search target pattern generation unit generates the search target pattern by combining the appearance patterns of a plurality of video contents.

10. The image processing device according to claim 1, further comprising:

a metadata generation unit which generates the appearance pattern of an object by identifying the object from still image time series data, where the still image time series data is extracted at a predetermined time interval from the video content; and a storage unit which stores the appearance pattern generated by the metadata generation unit.

11. The image processing device according to claim 10, wherein the metadata generation unit calculates, in relation to the still image time series data, an object appearance ratio and an appearance ratio per character, and the storage unit stores the object appearance ratio and the appearance ratio per character as character statistical information.

12. The image processing device according to claim 10, wherein the metadata generation unit detects, in relation to the still image time series data, a scene change point, and the storage unit also stores scene change point information which serves as information of the scene change point.

13. The image processing device according to claim 10, wherein the metadata generation unit also compresses the generated appearance pattern of the object.

14. The image processing device according to claim 10, wherein the metadata generation unit also performs noise removal on the generated appearance pattern of the object.

15. An image processing method comprising:

acquiring a search pattern which is an appearance pattern of an object in a scene of a video content containing that scene, the appearance pattern representing the number of respective still images included in that scene in which the object appears and the number of respective still images included in that scene in which the object does not appear, acquiring a search target pattern which is an appearance pattern of an object in a video content which is searched for a similar scene, the appearance pattern of the search target pattern representing the number of respective still images included in the scene of the video content which is searched in which the object appears and the number of respective still images included in the scene of the video content which is searched in which the object does not appear;

calculating a degree of similarity between the search pattern and the search target pattern; and determining that the scene in the video content which is searched is the similar scene on a basis of the calculated degree of similarity.

16. A non-transitory computer-readable medium on which is stored a program which causes a computer to function as an evaluation unit which acquires a search pattern which is an appearance pattern of an object in a scene of a video content containing that scene, the appearance pattern representing the number of respective still images included in that scene in which the object appears and the number of respective still images included in that scene in which the object does not a ear, the evaluation unit acquires a search target pattern which is an appearance pattern of an object in a video content which searched for a similar scene, the appearance pattern of the search target pattern representing the number of respective still images included in the scene of the video content which is searched in which the object appears and the number of respective still images included in the scene of the video content which is searched in which the object does not appear, calculates a degree of similarity between the search pattern and the search target pattern, and
determines that the scene in the video content which is searched is the similar scene on a basis of the calculated degree of similarity.

* * * * *